United States Patent
Fu et al.

(10) Patent No.: US 12,041,639 B2
(45) Date of Patent: *Jul. 16, 2024

(54) METHOD AND APPARATUS FOR ALLOCATING RESOURCES IN WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 705 days.

This patent is subject to a terminal disclaimer.

(21) Appl. No.: 17/180,704

(22) Filed: Feb. 19, 2021

(65) Prior Publication Data

US 2021/0176760 A1    Jun. 10, 2021

Related U.S. Application Data

(63) Continuation of application No. 16/335,170, filed as application No. PCT/KR2017/010467 on Sep. 22, 2017, now Pat. No. 10,932,274.

(30) Foreign Application Priority Data

Sep. 23, 2016 (CN) .......................... 201610848621.4

(51) Int. Cl.
*H04W 72/53* (2023.01)
*H04L 5/00* (2006.01)
(Continued)

(52) U.S. Cl.
CPC .......... *H04W 72/53* (2023.01); *H04L 5/0046* (2013.01); *H04L 5/0053* (2013.01);
(Continued)

(58) Field of Classification Search
CPC .............. H04W 72/53; H04W 72/0453; H04L 5/0046; H04L 5/0053; H04L 5/0094; H04L 27/2666
See application file for complete search history.

(56) References Cited

U.S. PATENT DOCUMENTS

2017/0367046 A1* 6/2017 Papasakellariou .... H04L 5/0048
2017/0215170 A1* 7/2017 Islam .................. H04L 27/2601
(Continued)

OTHER PUBLICATIONS

ISA/KR, "International Search Report and Written Opinion of the International Searching Authority," International Application No. PCT/KR2017/010467, Jan. 18, 2018, 8 pages.
(Continued)

*Primary Examiner* — Ronald B Abelson

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure discloses a method for operating a user equipment (UE), including: determining a type of numerology of physical resources to receive control signals and data from at least two types of multicarrier parameter numerology; and receiving the control signals and the data on the physical resources according to the determined type of numerology. The present disclosure further discloses a corresponding apparatus. By applying the technical solution disclosed in the present disclosure, it is possible to make full use of physical resources that have different characteristics.

12 Claims, 18 Drawing Sheets

(51) Int. Cl.
　　　*H04L 27/26*　　　(2006.01)
　　　*H04W 72/04*　　　(2023.01)
　　　*H04W 72/0453*　　(2023.01)

(52) U.S. Cl.
　　　CPC ........ *H04L 5/0094* (2013.01); *H04L 27/2666* (2013.01); *H04W 72/0453* (2013.01); *H04L 5/0007* (2013.01)

(56) References Cited

U.S. PATENT DOCUMENTS

2018/0352590 A1　　12/2018　Sha et al.
2019/0230696 A1　　7/2019　Kim et al.

OTHER PUBLICATIONS

3GPP TS 38.211 V15.4.0 (Dec. 2018), Technical Specification, 3rd Generation Partnership Project; Technical Specification Group Radio Access Network; NR; Physical channels and modulation (Release 15), Dec. 2018, 96 pages.
3GPP TS 38.212 V15.4.0 (Dec. 2018), Technical Specification, 3rd Generation Partnership Project; Technical Specification Group Radio Access Network; NR; Multiplexing and channel coding (Release 15), Dec. 2018, 100 pages.
3GPP TS 38.213 V15.4.0 (Dec. 2018), Technical Specification, 3rd Generation Partnership Project; Technical Specification Group Radio Access Network; NR; Physical layer procedures for control (Release 15), Dec. 2018, 104 pages.
3GPP TS 38.214 V15.4.0 (Dec. 2018), Technical Specification, 3rd Generation Partnership Project; Technical Specification Group Radio Access Network; NR; Physical layer procedures for data (Release 15), Dec. 2018, 102 pages.
Ericsson, "On resource allocation and guard subcarriers for mixed numerologies," R1-167033, 3GPP TSG RAN WG1 Meeting #86, Gothenburg, Sweden, Aug. 22-26, 2016, 3 pages.
ETRI, "On design of mixed numerology in a NR carrier," R1-166941, 3GPP TSG RAN WG1 Meeting #86, Gothenburg, Sweden, Aug. 22-26, 2016, 4 pages.
Huawei et al., "Overview of frame structure for NR," R1-166102, 3GPP TSG RAN WG1 Meeting #86, Gothenburg, Sweden, Aug. 22-26, 2016, 8 pages.
LG Electronics et al., "WF on Supporting different Numerologies in a NR carrier," R1-165837, 3GPP TSG RAN WG1 Meeting #85, Nanjing, China, May 23-27, 2016, 3 pages.
Nokia et al., "Resource block and guard band arrangement supporting mixed numerology," R1-167260, 3GPP TSG RAN WG1 Meeting #86, Gothenburg, Sweden, Aug. 22-26, 2016, 5 pages.

* cited by examiner

METHOD AND APPARATUS FOR ALLOCATING RESOURCES IN WIRELESS COMMUNICATION SYSTEM

CROSS-REFERENCE TO RELATED APPLICATIONS

This application is a continuation of application Ser. No. 16/335,170, which is the 371 National Stage of International Application No. PCT/KR2017/010467, filed on Sep. 22, 2017, which claims priority to Chinese Patent Application No. 201610848621.4, filed Sep. 23, 2016, the disclosures of which are herein incorporated by reference in their entirety.

BACKGROUND

1. Field

The present disclosure relates to radio communications and in particular to a method and apparatus for allocating resources.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

An aspect of the present disclosure to provide a method and apparatus for effectively allocating resources.

The present disclosure provides a method for allocating resources, so as to make full use of physical resource that have different characteristics (e.g., resources that have different OFDM subcarrier widths).

The present disclosure discloses a method for allocating resources, including:
determining, by a user equipment (UE), a type of numerology of physical resources to receive control signals and data from at least two types of multicarrier parameter numerology; and
receiving, by the UE, the control signals and the data on determined physical resources according to the determined type of numerology.

Preferably, before the determining, by a UE, a type of numerology of physical resources to receive control signals and data, the method further includes: reporting, by the UE, an ability to process one or at least two fast Fourier transforms (FFTs) at a time to a base station, and determining an operation mode of the UE according to at least one of the following ways A to D:

A, in a case where the UE has only the ability to process one FFT at a time, determining that the operation mode of the UE is receiving control signals and data of only one type of numerology at a time; and in a case where the UE has the ability to process at least two FFTs at a time, then determining that the operation mode of the UE is receiving control signals and data of only one type of numerology at a time, or determining that the operation mode of the UE is receiving control signals and data of at least two types of numerology at a time;

B, in a case where all UEs have only the ability to process one FFT at a time, determining that the operation mode of the UE is receiving control signals and data of only one type of numerology;

C, in a case where all the UEs have only the ability to process one FFT at a time, determining that the operation mode of the UE is receiving control signals and data of different types of numerology at different times; and D, in a case where the UE has only the ability to process one FFT at a time, then determining that the operation mode of the UE is receiving control signals and data of only one type of numerology at a time, and transmitting data of the UE that have different latency requirements through time slots of different orthogonal frequency division multiplexing (OFDM) symbols to meet the different latency requirements; and in a case where the UE has the ability to process at least two FFTs at a time, then determining that the operation mode of the UE is receiving control signals and data of only one type of numerology at a time, and transmitting the data of the UE that have the different latency requirements through the time slots of the different OFDM symbols to meet the different latency requirements, or determining that the operation mode of the UE is receiving control signals and data of at least two types of numerology at a time, and transmitting the data of the UE that have the different latency requirements through time slots of different lengths obtained according to different types of numerology; and determining, by the UE, the type of numerology of the physical resources to receive the control signals and the data according to the determined operation mode.

Preferably, for the way C, the determining, by a UE, a type of numerology of physical resources to receive control signals and data includes: determining, by the UE, the type of numerology of the physical resources to receive the control signals and the data by receiving higher layer signaling.

Preferably, in a case where the UE determines that there are at least two types of numerology of physical resources to receive the control signals and the data within a system bandwidth of one carrier by receiving the higher layer signaling, and there is a set of synchronization signal, broadcast information and system information in each type of numerology, the receiving, by the UE, the control signals and the data on determined physical resources according to the determined type of numerology includes: receiving, by the UE, the control signals, the data, a synchronization signal, broadcast information and system information by using the same numerology.

Preferably, for the way C, the determining, by a UE, a type of numerology of physical resources to receive control signals and data includes: determining, by the UE, the type of numerology of the physical resources to receive the control signals and the data by receiving higher layer signaling.

Preferably, in a case where the UE determines that there are at least two types of numerology of physical resources to receive the control signals and the data within a system bandwidth of one carrier by receiving the higher layer signaling, the receiving, by the UE, the control signals and the data on determined physical resources according to the determined type of numerology includes: defining the at least two types of numerology determined by receiving the higher layer signaling as a first type of numerology, defining a type of numerology other than the at least two types of numerology as a second type of numerology, determining, by the UE, a subframe to receive control signals and data of the first type of numerology and a subframe to receive control signals and data of the second type of numerology according to higher layer signaling or a physical layer indication, and receiving a synchronization signal, broadcast information and system information transmitted according to the second type of numerology.

Preferably, for the way C, the determining, by a UE, a type of numerology of physical resources to receive control signals and data comprises: determining, by the UE, at least two types of candidate numerology of the physical resources to receive the control signals and the data by receiving higher layer signaling, and determining, by the UE, a type of numerology or types of numerology to receive the control signals and/or the data from the at least two candidate types of numerology of the physical resources to receive the control signals and the data according to an indication by the controlling signaling.

Preferably, the determining, by the UE, a type of numerology or types of numerology to receive the control signals and/or the data according to an indication by the controlling signaling is performed in at least one of the following ways:

way 1, in which downlink control information (DCI) used to allocate physical resources of at least two types of numerology is only transmitted on a physical resource of one type of numerology, and after the UE receives DCI that schedules data, the UE knows a physical resource for the UE to receive data and a corresponding numerology by analyzing the DCI; wherein the DCI used to allocate the physical resources of the at least two types of numerology is located in a same subframe with that in which the data scheduled by the DCI is located, or is located in a subframe before the data scheduled by the DCI;

way 2, in which DCI used to allocate a physical resource of each type of numerology and physical resources used to transmit data scheduled by the DCI have a same numerology, and after the UE receives DCI that schedules data, the UE determines that a type of numerology of a physical resource on which the data is received and a type of numerology of a physical resource on which the DCI is received are same;

way 3, in which the UE receives DCI according to numerology indication information, and determines a type of numerology of receiving DCI that allocates physical resources of numerology according to a time position of the DCI;

way 4, in which the UE receives DCI, and determines a type of numerology of receiving DCI that allocates physical resources of numerology according to a time position of the DCI;

way 5, in which DCI used to allocate a physical resource of each type of numerology and physical resources used to transmit data scheduled by the DCI have a same numerology, and after the UE receives DCI that schedules data, the UE determines that a type of numerology of a physical resource on which the data is received and a type of numerology of a physical resource on which the DCI is received are same; and in a case where the UE is configured to need to receive DCI that allocates physical resources of at least two types of numerology, the UE first receives numerology indication information, and then knows numerology of physical resources on which DCI and data are received according to the numerology indication information.

Preferably, the UE knowing numerology of physical resources on which DCI and data are received according to the numerology indication information includes at least one of the following situations:

situation 1, where the UE determines a type of numerology for the UE to receive control signals and data in a subframe where the numerology indication information is transmitted according to an indication by the numerology indication information, or the UE determines a type of numerology for the UE to receive control signals and data in a current subframe according to the indication by the numerology indication information, or the UE determines a type of numerology for the UE to receive control signals and data from N subframes counted starting from a subframe n where the numerology indication information is transmitted according to the indication by the numerology indication information, where N is a positive integer; wherein the numerology indication information is only transmitted on physical resources of one type of numerology, the UE knows a subframe position for the UE to receive the numerology indication information by receiving higher layer signaling, and the UE knows a type of numerology for the UE to receive the transmitted numerology indication information by receiving the higher layer signaling;

situation 2, where the UE determines a type of numerology for the UE to receive control signals and data in a subframe n+k after the subframe n where the numerology indication information is transmitted according to the indication by the numerology indication information, or the UE determines a type of numerology for the UE to receive control signals and data in N subframes counted starting from the subframe n+k after the subframe n where the numerology indication information is transmitted according to the indication by the numerology indication information, where k and N are positive integers;

wherein the numerology indication information is only transmitted on physical resources of one type of numerology, the UE knows a subframe position for the UE to receive the numerology indication information by receiving higher layer signaling, and the UE knows a type of numerology for the UE to receive the numerology indication information by receiving the higher layer signaling; in a case where the UE receives control signals and data transmitted by different numerology within a subframe indicated by the numerology indication information, the UE first completes receipt of control signals and data transmitted by a first type of numerology, and then receives the numerology indication information;

situation 3, where the UE determines a type of numerology for the UE to receive control signals and data in the subframe n+k after the subframe n where the numerology indication information is transmitted according to the indication by the numerology indication information, or the UE determines a type of numerology for the UE to receive control signals and data in N subframes counted starting from the subframe n+k after the subframe n where the numerology indication information is transmitted according to the indication by the numerology indication information, where k and N are positive integers;

wherein the numerology indication information is only transmitted on physical resources of one type of numerology, the UE knows a subframe position for the UE to receive the numerology indication information by receiving higher layer signaling, and the UE knows a type of numerology for the UE to receive the numerology indication information by receiving the higher layer signaling; in a case where the UE needs to receive control signals and data transmitted by a same numerology within a subframe where the numerology indication information is received, the UE receives both control signals and data and the numerology indication information; in a case where the UE does not need to receive control signals and data transmitted within the subframe where the numerology indication information is received, the UE receives the numerology indication information; and in a case where the UE needs to receive control signals and data transmitted by different numerology within the subframe where the UE receives the numerology indication information, the UE receives control signals and data and receives numerology indication information contained in a control signals that schedules transmission of the UE, or numerology indication information transmitted in resources of control signals that schedules the transmission of the UE and data.

Preferably, in a case where in a system bandwidth of one carrier, there are physical resources of at least two types of numerology, the number of types of numerology within the system bandwidth and a resource range of each type of numerology are configured by higher layer signaling or indicated by system information; or in a case where in a system bandwidth of one carrier, there are physical resources of at least two types of numerology, and the number of types of numerology within the system bandwidth is configured by higher layer signaling or indicated by system information, wherein a time-frequency resource range of each type of numerology dynamically changes, and changes in at least one of the following ways: one way being implicit indication by DCI which schedules resources, and the other way being indicating the time-frequency resource range of each type of numerology by numerology resource range indication information.

The present disclosure further discloses an apparatus, including: a determination module and a receiving module, in which:

the determination module determines a type of numerology of physical resources to receive control signals and data from at least two types of multicarrier parameter numerology; and the receiving module receives the control signals and the data on determined physical resources according to the determined type of numerology.

As is seen from the foregoing, according to the technical solution of resource allocation of the present disclosure, first a UE determines a type of numerology of physical resources to receive control signals and data from at least two types of multicarrier parameter numerology; and then the UE receives the control signals and the data on determined physical resources according to the determined type of numerology, so as to make full use of physical resources that have different characteristics (e.g., resources that have different OFDM subcarrier widths).

Various embodiments of the present disclosure provide resource allocation scheme that is more effective.

DETAILED DESCRIPTION

To make the objects, technical schemes and advantages of the present disclosure clearer, the present disclosure will be described in detail hereinafter with reference to accompanying drawings and embodiments.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for allocating resource in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Figure 1:
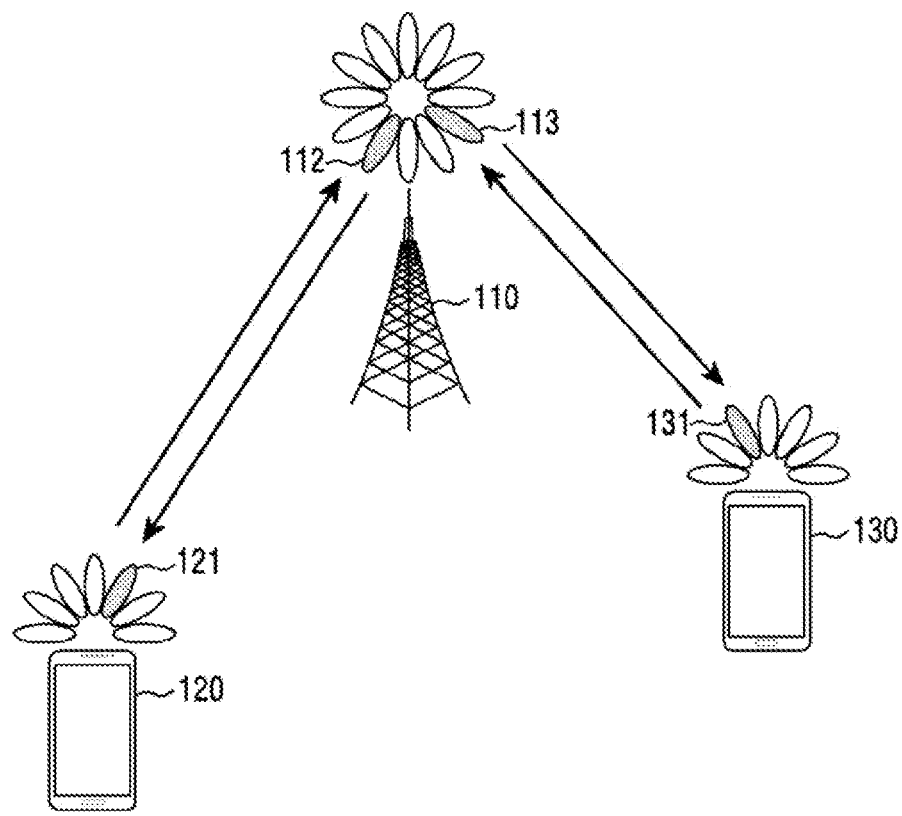
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
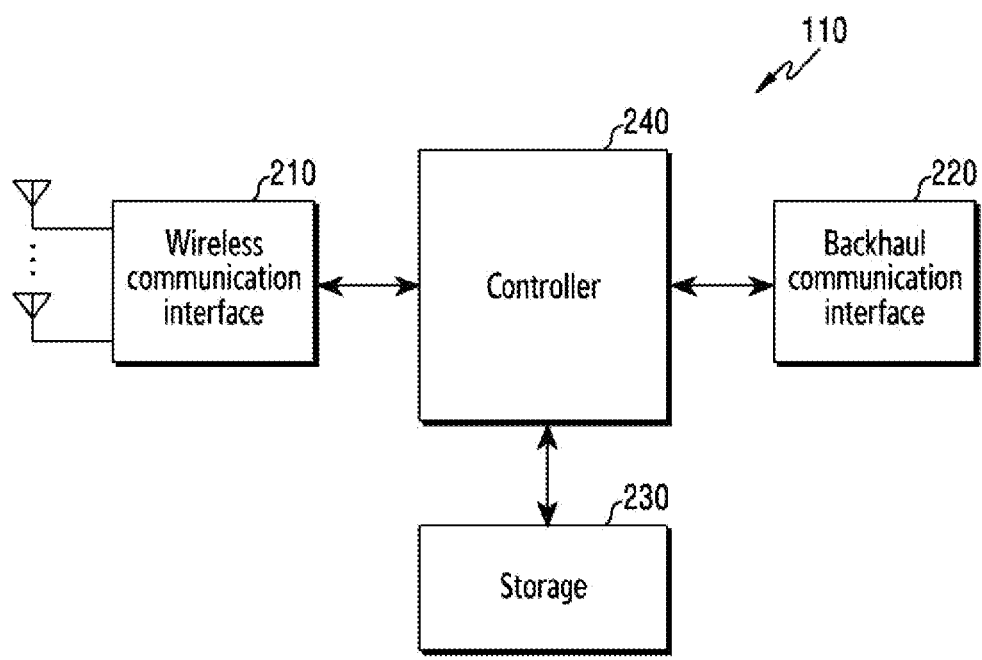
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a radio frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may determining a type of numerology of physical resources to transmit control signals and data from at least two types of multicarrier parameter numerology, and control to transmit the control signals and the data on physical resources according to the determined type of numerology. For example, the controller 240 may control the base station to perform operations according to the exemplary embodiments of the present disclosure.

Figure 3:
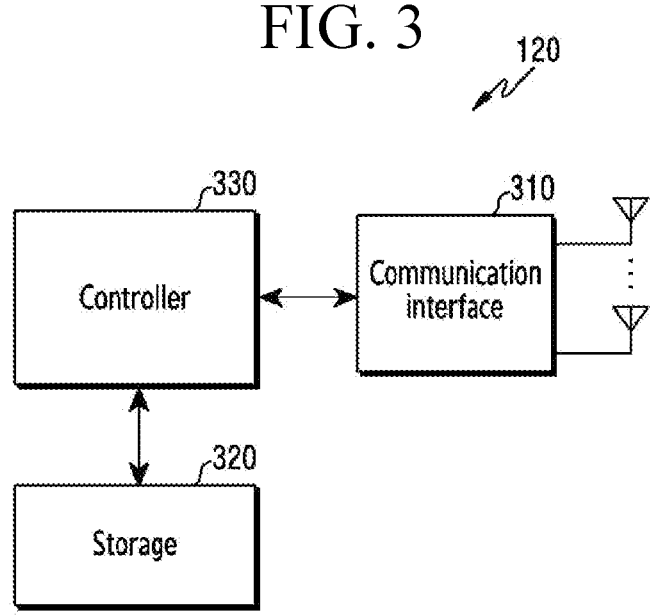
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may determine a type of numerology of physical resources to receive control signals and data from at least two types of multicarrier parameter numerology and control to receive the control signals and the data on physical resources according to the determined type of numerology. For example, the controller 330 may control the terminal to perform operations according to the exemplary embodiments of the present disclosure.

Figure 4:
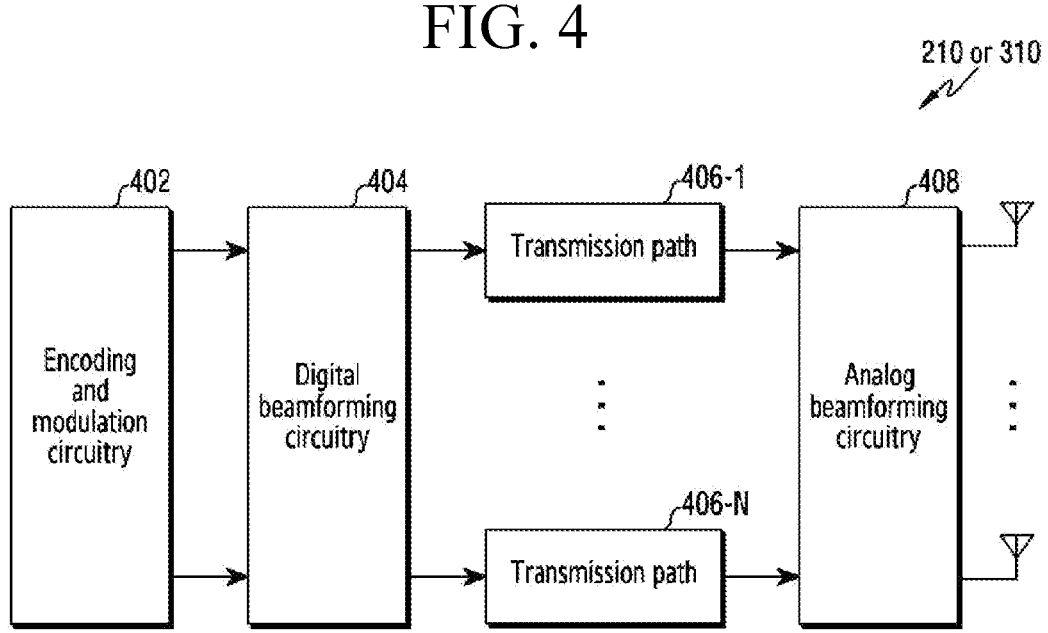
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Figure 5:
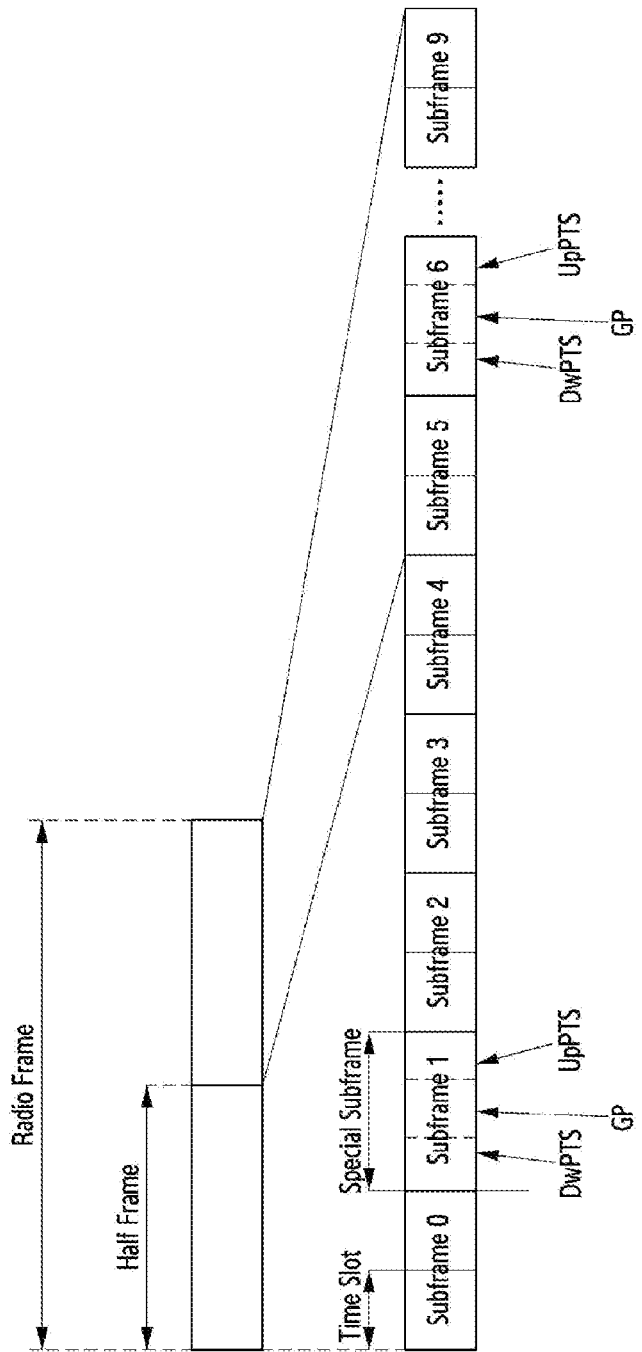
FIG. 5 is a schematic diagram of a frame structure in a long term evolution (LTE) time division duplex (TDD) system.
Figure 6:
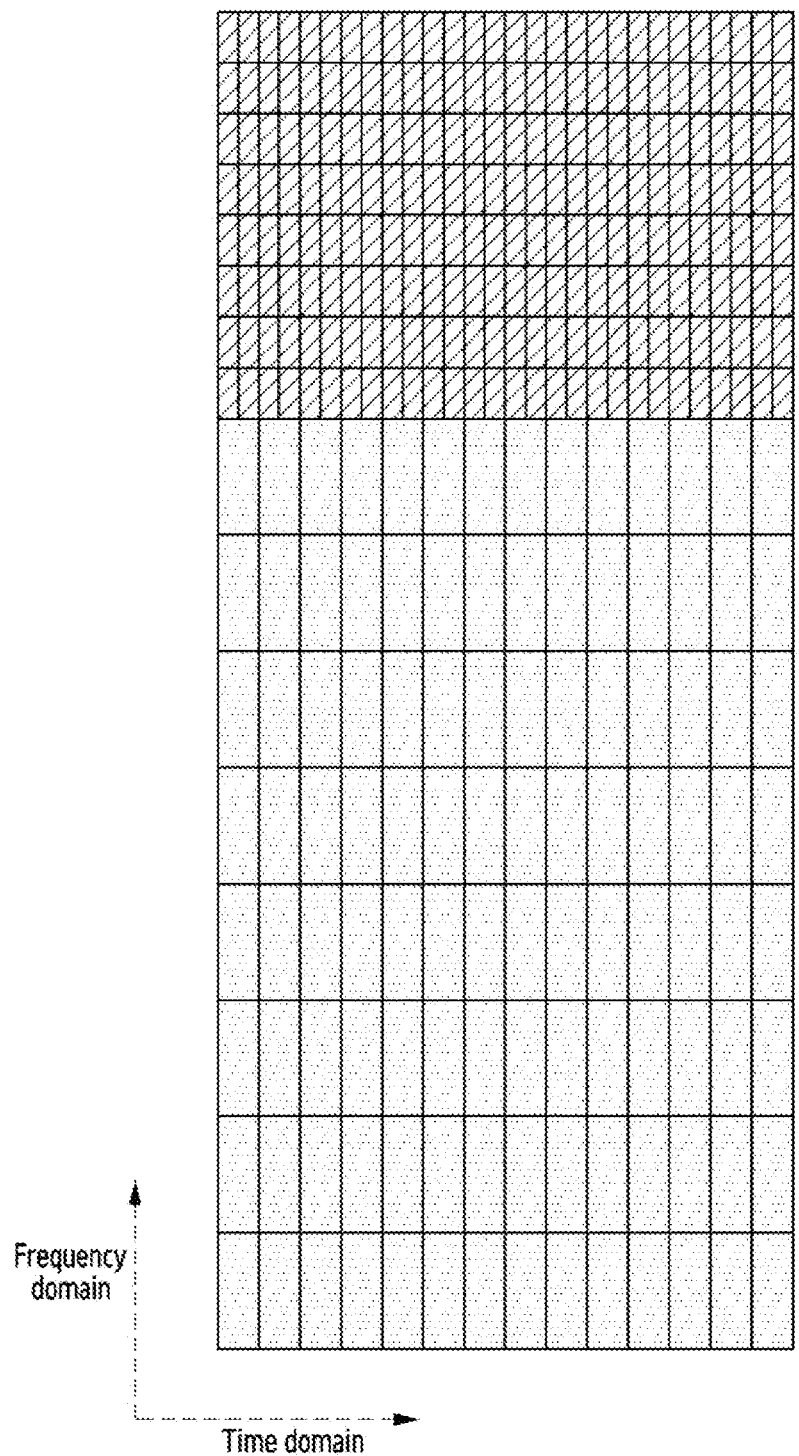
FIG. 6 is a schematic diagram showing a problem existing in the traditional art.

Long term evolution (LTE) techniques support two types of duplexing: frequency division duplexing (FDD) and time division duplexing (TDD). Transmissions in a TDD system include a transmission from a base station (eNB) to a user equipment (UE) (referred to as an uplink) and a transmission from the UE to the base station (referred to as a downlink). For a TDD system, an uplink and a downlink are transmitted on a same carrier at different times respectively; while for a FDD system, an uplink and a downlink are transmitted on different carriers respectively. FIG. 5 is a schematic diagram of a frame structure of an LTE TDD system. In FIG. 5, each radio frame is 10 milliseconds (ms) long, and is equally divided into two half frames having a length of 5 ms each. Each half frame includes 8 time slots having a length of 0.5 ms each and 3 special fields having an overall length of 1 ms. The 3 special fields are respectively a downlink pilot time slot (DwPTS), a guard period (GP), and an uplink pilot time slot (UpPTS). Each subframe consists of two consecutive time slots.

Based on the frame structure shown in FIG. 5, downlinks and uplinks share 10 subframes in every 10 ms, and each subframe is configured either for an uplink or for a downlink. A subframe configured for an uplink is called an uplink subframe, and a subframe configured for a downlink is called a downlink subframe. The TDD system supports 7 TDD uplink and downlink configurations, as shown in Table 1:

TABLE 1

| Configuration | Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

"D" represents a downlink subframe, "U" represents an uplink subframe, and "S" represents a special subframe containing the 3 special fields. Each subframe includes 14 orthogonal frequency division multiplexing (OFDM) symbols, and the width of a subcarrier is 15 kHz, each physical resource block (PRB) includes 12 subcarriers, and the frequency domain width of a PRB is 18 kHz.

Downlink data are transmitted through a physical downlink shared channel (PDSCH), the hybrid automatic retransmission request-acknowledgement information of a PDSCH may be transmitted through a physical uplink shared channel (PUSCH) or a physical uplink control channel (PUCCH). Uplink data are transmitted through a physical uplink shared channel (PUSCH). PDSCH and PUSCH are scheduled by physical downlink control channel (PDCCH)/enhanced physical downlink control channel (EPDCCH).

Since carrier frequencies used by UEs to transmit data are different, the UEs moves at different speeds, cell sizes are different, and service latency and reliability requirements are different, subcarrier widths used by the UEs to transmit data may be different, cyclic prefix (CP) lengths of OFDM symbols used by the UEs to transmit data may be different, and subcarrier widths or CP lengths of OFDM symbols of physical resources may be different, which cases are all called numerology being different. For example, in a carrier, there are subcarrier resources of 15 KHz and 30 kHz, as shown in FIG. 2. This present disclosure is focused on how to reasonably allocate resources that have different subcarrier widths when the resources that have the different subcarrier widths are present on a carrier, so as to make full use of the resources under the premise of meeting various requirements.

Figure 7:
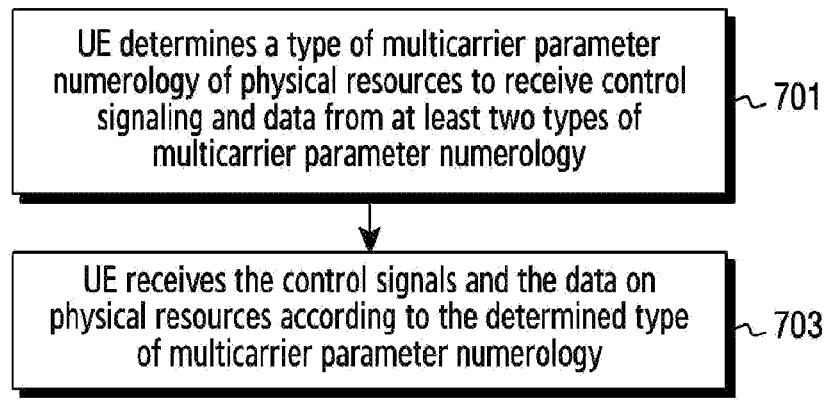
FIG. 7 is a flowchart of a method for allocating resources according to the present disclosure.

To achieve the objects of the present disclosure, the present disclosure provides a method for allocating resources, as shown in FIG. 7, and the method includes the following steps.

Referring FIG. 7, in step 701, a UE determines a type of multicarrier parameter numerology of physical resources to receive control signals and data from at least two types of multicarrier parameter numerology. The numerology described herein refers to some characteristics of the physical resources, such as a subcarrier width (e.g., a subcarrier spacing) and/or the CP length of OFDM symbols on which control signals and data are received. In step 703, the UE receives the control signals and the data on physical resources according to the determined multicarrier parameter numerology.

The technical scheme of the present disclosure will be described in further detail with reference to several preferred embodiments.

Embodiment 1

The present embodiment describes a case where UEs have an ability or a capability to process one or more fast Fourier transforms (FFTs) at a time, and the UEs receive control signals and data in different ways depending on the FFT processing abilities of the UEs.

One way is that some UEs have only the ability to process one FFT at a time, and some UEs have the ability to process multiple FFTs at a time. The UEs should report their abilities to process one or more FFTs at a time to a base station. If a UE has only the ability to process one FFT at a time, the base station transmits control signals and data of only one type of numerology at a time, and the UE receives control signals and data of one type of numerology at a time. If a UE has the ability to process multiple FFTs at a time, the UE determines to receive control signals and data of one type of numerology at a time by receiving higher layer signaling configuration, or the UE determines to receive control signals and data of multiple types of numerology at a time by receiving higher layer signaling configuration. Receiving control signals and data of multiple types of numerology at a time requires the UE have the ability to process multiple FFTs at a time, and this will increase the processing ability of the UE, but will improve the peak rate of the UE, because the UE can receive data from more resources.

Another way is that all the UEs only have the ability to process one FFT at a time and have been working in a mode of receiving control signals and data of the same type of numerology all the time.

Figure 8:
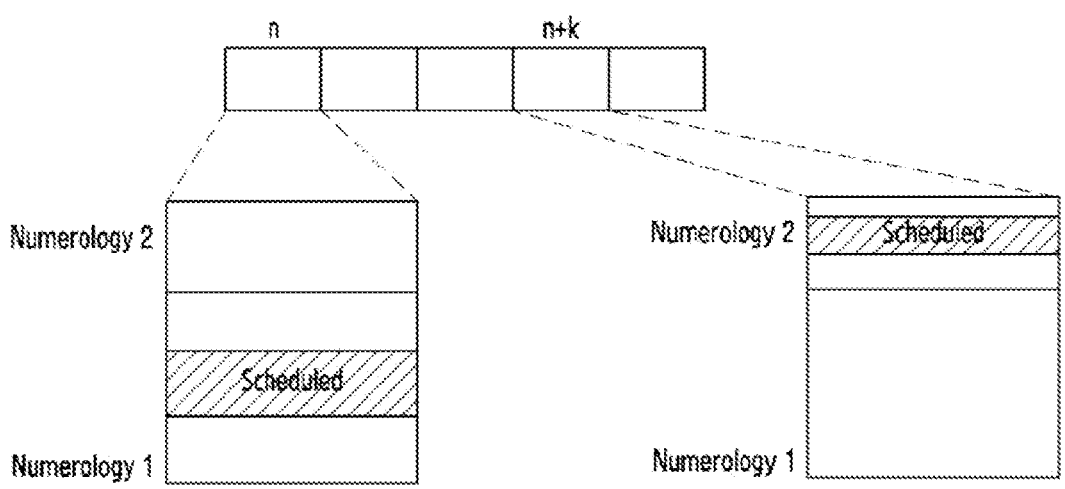
FIG. 8 is a schematic diagram showing that each user equipment (UE) receives control signals and data of different numerology in different time durations in Embodiment 1 of the present disclosure.

Another way is that all the UEs have only the ability to process one FFT at a time, and each UE can receive control signals and data of different types of numerology at different times. For example, a UE receives control signals and data of an OFDM symbol that has a subcarrier width of 15 kHz in a subframe n, and the UE receives control signals and data of an OFDM symbol that has a subcarrier width of 30 kHz in a subframe n+k, as shown in FIG. 8. The UE may determine a type of numerology to receive control signals and data by receiving signaling (e.g., higher layer signaling or physical layer signaling), or determine a type of numerology to receive control signals and data according to a preset method (e.g., a default numerology determined according to a protocol).

Yet another way is that some UEs have only the ability to process one FFT at a time, and some UEs have the ability to process multiple FFTs at a time. The UEs need to receive data that have a normal latency (e.g., enhanced mobile broadband (eMBB) service) and data that have a low latency (e.g., ultra reliability low latency communication (URLLC)). The UEs need to report their ability to process one or more FFTs at a time to the base station. If a UE has only the ability to process one FFT at a time, the base station transmits control signals and data of only one type of numerology to the UE at a time, and the UE receives control signals and data of one type of numerology at a time. The eMBB data and URLLC data are transmitted through time slots of different numbers of OFDM symbols to the UE, so as to meet the different latency requirements. For example, the eMBB data are transmitted through a time slot of M1 (M1 is a positive integer, configured by higher layer signaling or determined according to the protocol, e.g., M1 is equal to 14) OFDM symbols, and the URLLC data are transmitted through a time slot of M2 (M2 is a positive integer, configured by high layer signaling or determined according to the protocol, and M2 is less than M1, e.g., M2 is equal to 2) OFDM symbols. If a UE has the ability to process multiple FFTs at a time, and the UE determines to operate in the mode of receiving control signals and data of one type of numerology at a time by receiving higher layer signaling configuration, then the base station transmits control signals and data of only one type of numerology to the UE at a time, and the UE receives control signals and data of only one type of numerology at a time. The eMBB data and URLLC data are transmitted through time slots of different numbers of OFDM symbols to meet different latency requirements. For example, the eMBB data is transmitted through a time slot of M1 (M 1 is a positive integer, configured by higher layer signaling or determined according to the protocol, e.g., M1 is equal to 14) OFDM symbols, and the URLLC data is transmitted through a time slot of M2 (M2 is a positive integer, configured by higher layer signaling or determined according to the protocol, and M2 is less than M1, e.g., M2 is equal to 2) OFDM symbols. Or if a UE has the ability to process multiple FFTs at a time, and the UE determines to operate in the mode of receiving control signals and data of multiple types of numerology at a time by receiving higher layer signaling configuration, then the eMBB data and URLLC data are transmitted through time slots of different lengths obtained according to different numerology to meet the different latency requirements. Receiving control signals and data of multiple types of numerology at a time requires the UE have the ability to process multiple FFTs at a time, and this will increase the processing ability of the UE, but will improve the peak rate of the UE, because the UE can receive data from more resources.

Embodiment 2

The present embodiment describes several methods for a UE to receive control signals and data of different types of numerology, in a case where UEs have only the ability to process one FFT at a time, and each UE can receive control signals and data of different types of numerology at different times.

Method 1:

A UE determines a type of numerology of physical resources to receive control signals and data by receiving higher layer signaling, and then receives control signals and data according to the determined type of numerology. That is, the UE receives the control signals and the data according to a subcarrier width and a CP length of an OFDM symbol in a type of numerology configured according to the higher layer signaling. In this case, a type of numerology for the UE to receive control signals and a type of numerology for the UE to receive data are same or different.

Figure 9:
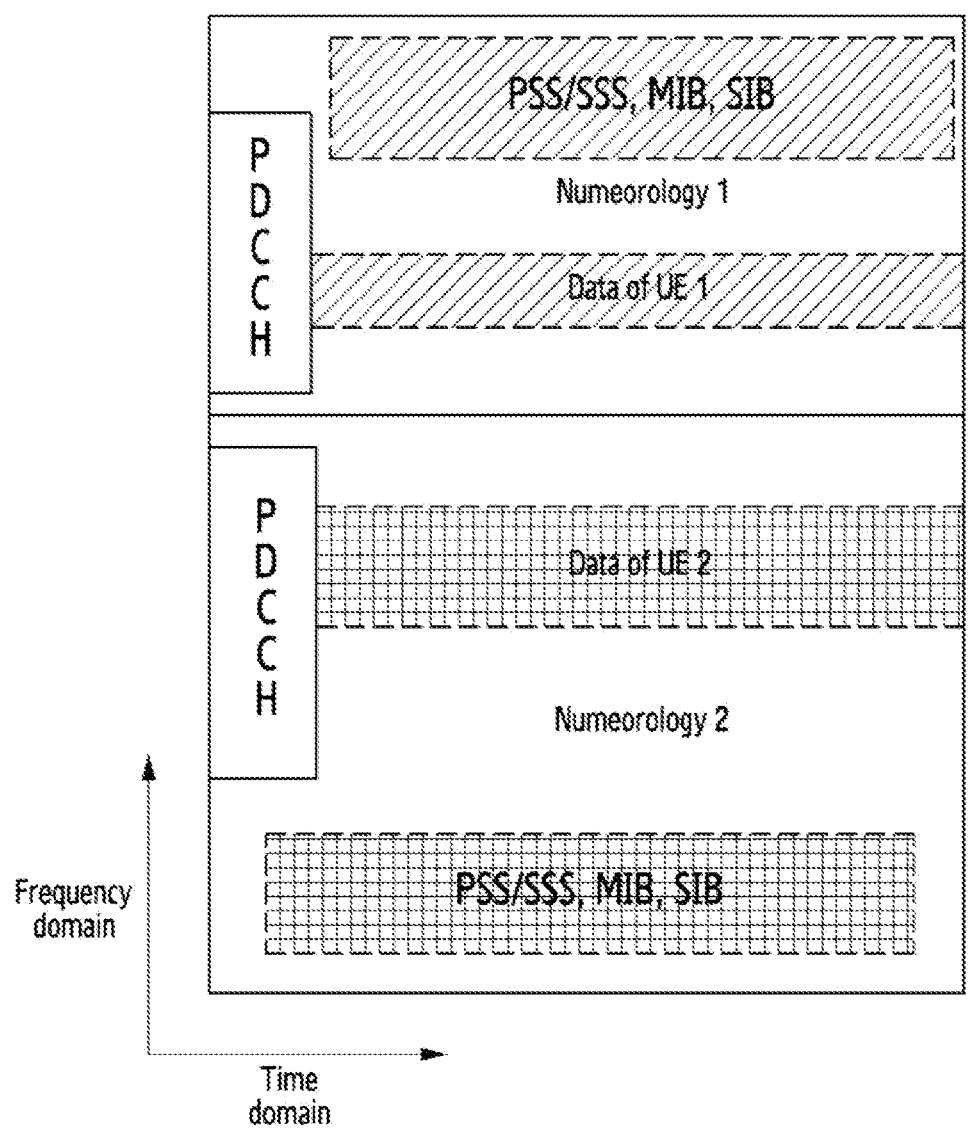
FIG. 9 is a schematic diagram showing that a type of numerology by which the UE receives control signals and data is the same as a type of numerology by which the UE receives PSS/SSS, broadcast information, and system information according to a Method 1 in Embodiment 2 of the present disclosure.

Since the UE determines a type(s) of numerology to receive control signals and data through the upper layer signaling configuration, if there are resources of multiple types of numerology within a system bandwidth of a carrier (or called a serving cell), then there is a set of synchronization signal (e.g., Primary Synchronization Signal/Secondary Synchronization Signal (PSS/SSS), broadcast information (Master Information Block (MIB)) and system information (System Information Block (SIB)) within each type of numerology, and a type of numerology for the UE to receive control signals and data and a type of numerology for the UE to receive PSS/SSS, broadcast information and system information are same or different, as shown in FIG. 9.

Method 2:

A UE determines a type of numerology to receive control signals and data by receiving higher layer signaling, and then receives control signals and data according to the determined type of numerology. That is, the UE receives control signals and data according to a subcarrier width and a CP length of an OFDM symbol in a type of numerology configured by according to the higher layer signaling configuration. In this case, a type of numerology for the UE to receive control signals and a type of numerology for the UE to receive data are same or different.

Since the UE determines the type of numerology to receive control signals and data according to the higher layer signaling configuration, which case is called a first type of numerology, if there are resources of multiple types of numerology within the system bandwidth of a carrier (or a serving cell), the UE may need to receive control signals and data of a type of numerology (referred to as second type of numerology) different from the first type of numerology, then the UE determines that, in which subframes (or which OFDM symbols), the UE needs to receive control signals and data of the second type of numerology different from the first type of numerology, and that, in which subframes, the UE needs to receive control signals and data of the first type of numerology, according to the protocol (or according to a higher layer signaling configuration, or according to an indication from a physical layer). For example, if the higher layer signaling configures that the UE receives control signals and data through the first type of numerology, and that the UE needs also to receive synchronization signal (e.g., PSS/SSS), broadcast information and system information and paging information transmitted through the second type of numerology, then the UE may receive PSS/SSS, broadcast information and system information transmitted through the second type of numerology at times when the PSS/SSS, the broadcast information and the system information are possibly transmitted.

Method 3:

The UE determines multiple possible types of numerology to receive control signals and data by receiving higher layer signaling, and then determines a type(s) of numerology to receive control signals and/or data according to an indication by control signals, and then the UE receives control signals and/or data at corresponding times (e.g., within subframes or OFDM symbols) according to the subcarrier bandwidth and CP length of OFDM symbols of the type of numerology(s) indicated. The UE determines the type of numerology(s) to receive control signals and/or data based on the indication by control signals in the following ways.

Figure 10:
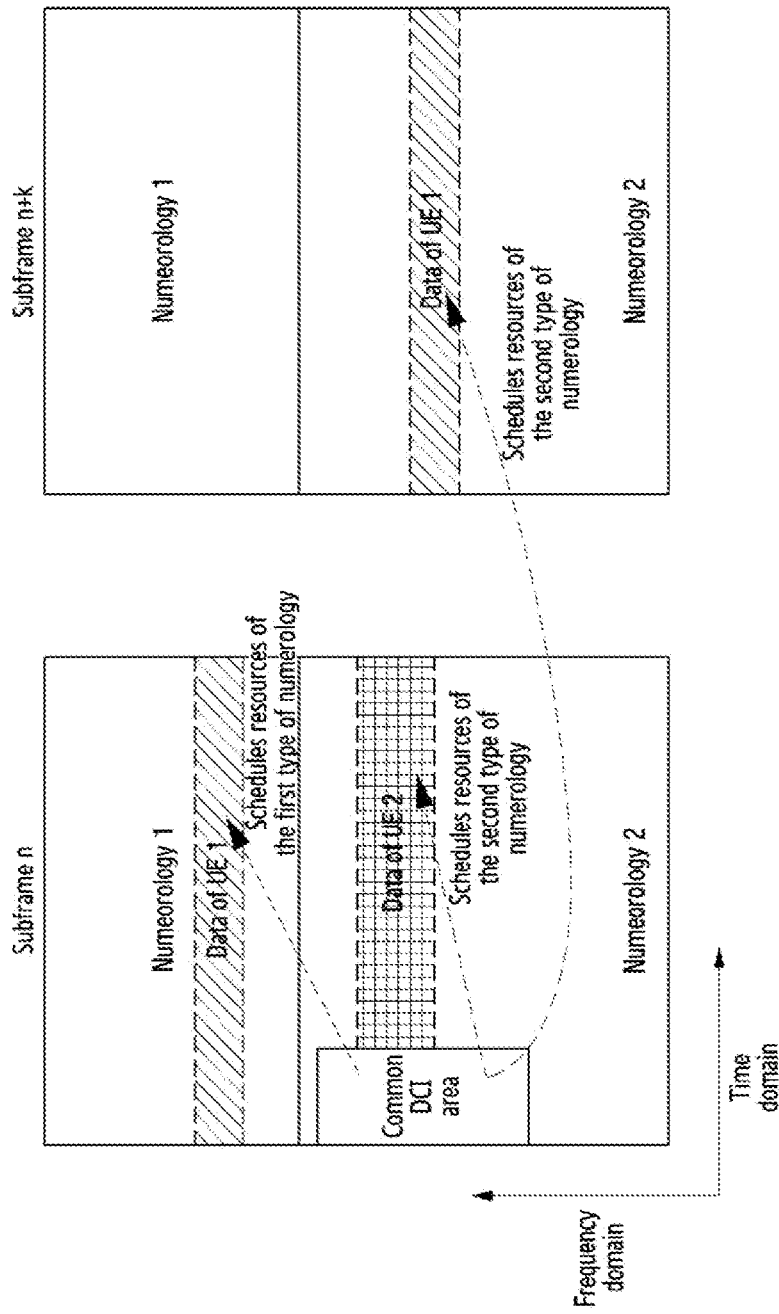
FIG. 10 is a schematic diagram showing downlink control information (DCI) for allocation of physical resources of multiple types of numerology and data scheduled by DCI are located in a same subframe or in a subframe before the data according to Way 1 of Method 3 in Embodiment 2 of the present disclosure.

Way 1:

Downlink control information (DCI) for allocation of physical resources of multiple types of numerology is transmitted only on physical resources of one type of numerology, and after the UE receives DCI for scheduling data, the UE knows a physical resource to receive the data and a type of numerology used to receive the data by analyzing the DCI, and then the UE receives data according to the subcarrier width and the CP length of the OFDM symbol of the determined type of numerology. A time-frequency position of a physical resource to transmit the DCI that can allocate physical resources of one or multiple types of numerology may be configured by higher layer signaling or determined according to the protocol. The DCI for allocation of physical resources of multiple types of numerology may be located in the same subframe as that in which data scheduled by the DCI may be located, or in a subframe prior to the data, as shown in FIG. 10. The type of numerology of physical resources for the UE to receive data may be differentiated according to different characteristics of the DCI. For example, a bit in the DCI may be used to indicate the number of numerology of physical resources for the UE to receive data, and the bit may be referred to as numerology indication information. For example, higher layer signaling configures that the number of types of numerology possible for the UE to receive control signals and data is 2, numerology indication information is 1 bit, and a mapping relationship between the values of numerology indication information and numerology is shown in FIG. 10. Alternatively, the type of numerology for the UE to receive data may be differentiated by the differences of RNTIs used to scramble the CRC of DCI.

TABLE 2 mapping relationship between the vales of numerology indication information and numerology

| Value of Numerology Indication Information | Numerology |
| --- | --- |
| 0 | First type of numerology |
| 1 | Second type of numerology |

Figure 11:
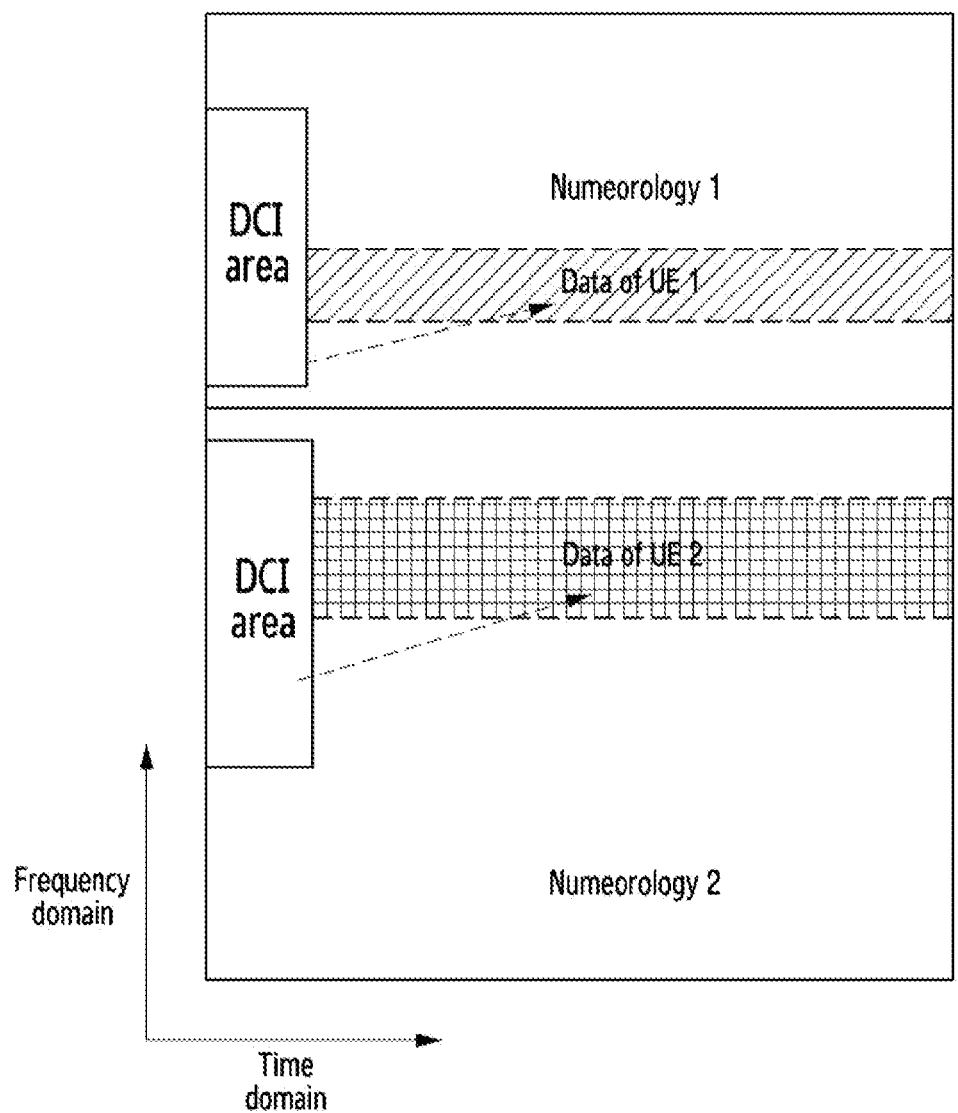
FIG. 11 is a schematic diagram showing that a type of numerology of DCI for allocation of physical resources of each type of numerology and a type of numerology of the DCI for scheduling physical resources to transmit data are same according to Way 2 of Method 3 in Embodiment 2 of the present disclosure.

Way 2:

A type of numerology of DCI that is used for allocation of physical resources of each type of numerology is the same with a type of numerology of a physical resource used for the DCI to schedule transmission data are the same, and after the UE receives DCI that schedules data, it receives data according to the subcarrier length and CP length of the OFDM symbol of a type of numerology the same as the type of numerology of the received DCI. The time-frequency positions of physical resources for transmitting DCI of each type of numerology are configured by higher layer signaling or determined by the protocol. The time-frequency positions of DCI for allocating physical resources of each type of numerology are as shown in FIG. 11, where DCI for scheduling the physical resources of the first type of numerology is transmitted using the first type of numerology, and DCI for scheduling the physical resources of the second type of numerology is transmitted using the second type of numerology.

In this case, if the UE is configured to need to receive DCI that allocates physical resources of multiple types of numerology, the UE may blindly detect DCI that schedules multiple types of numerology transmitted on physical resources of multiple types of numerology, and if the UE has detected DCI of a type of numerology in a subframe, and if the UE does not have the ability to process data transmitted over physical resources of multiple types of numerology within a same subframe, then the UE stops blindly detecting DCI of other types of numerology. In this way, the UE may blindly detect DCI that is transmitted on physical resources of multiple types of numerology, and the number of times of detecting DCI transmitted on physical resources of each type of numerology may be configured by higher layer, but the UE only receives data transmitted on one type of numerology resource.

Way 3:

If the UE needs to receive DCI that allocates physical resources of multiple types of numerology, the UE determines the types of numerology for receiving the DCI that allocates the physical resources of the type of numerology. When the time slot lengths of physical resources of different types of numerology are different, pieces of DCI that allocate physical resources of different numerology are transmitted at different times in the time domain, and the UE determines numerology to transmit the pieces of DCI for allocating physical resources at different times. A mapping relationship between times of blindly detecting DCI and numerology for blindly detecting transmitted DCI may be configured by higher layer signaling or preset by the protocol. For example, the UE needs to receive DCI that allocates physical resources of N types of numerology, and the mapping relationship between times of blindly detecting DCI that allocates the physical resources of the N types of numerology and the type of numerology for blindly detecting the transmitted DCI has been determined. If at a time of blindly detecting DCI that allocates a physical resource of a type of numerology, the UE is not configured to need to receive data on the allocated physical resource, the UE performs blind detection on a corresponding time-frequency position according to the mapping relationship between times of blindly detecting DCI that allocates physical resources of N types of numerology and the type of numerology for blindly detecting the transmitted DCI; if at a time of blindly detecting DCI that allocates a physical resource of a type of numerology, the US has already been allocated a physical resource for receiving data, the UE performs blind detection on a corresponding time-frequency position according to the mapping relationship between times of blindly detecting DCI that allocates physical resources of N types of numerology and the type of numerology for blindly detecting the transmitted DCI indicated by numerology indication information, or does not perform the blind detection but continue to receive data. Numerology indication information is received from a physical resource that is allocated for the UE to receive data, or from other physical resources a type of numerology of which is the same with a type of numerology of the physical resource that is allocated for the UE to receive data. Numerology indication information is in a time slot before the time of blindly detecting the transmitted DCI, or in a time slot same with the time of blindly detecting the transmitted DCI.

Figure 12:
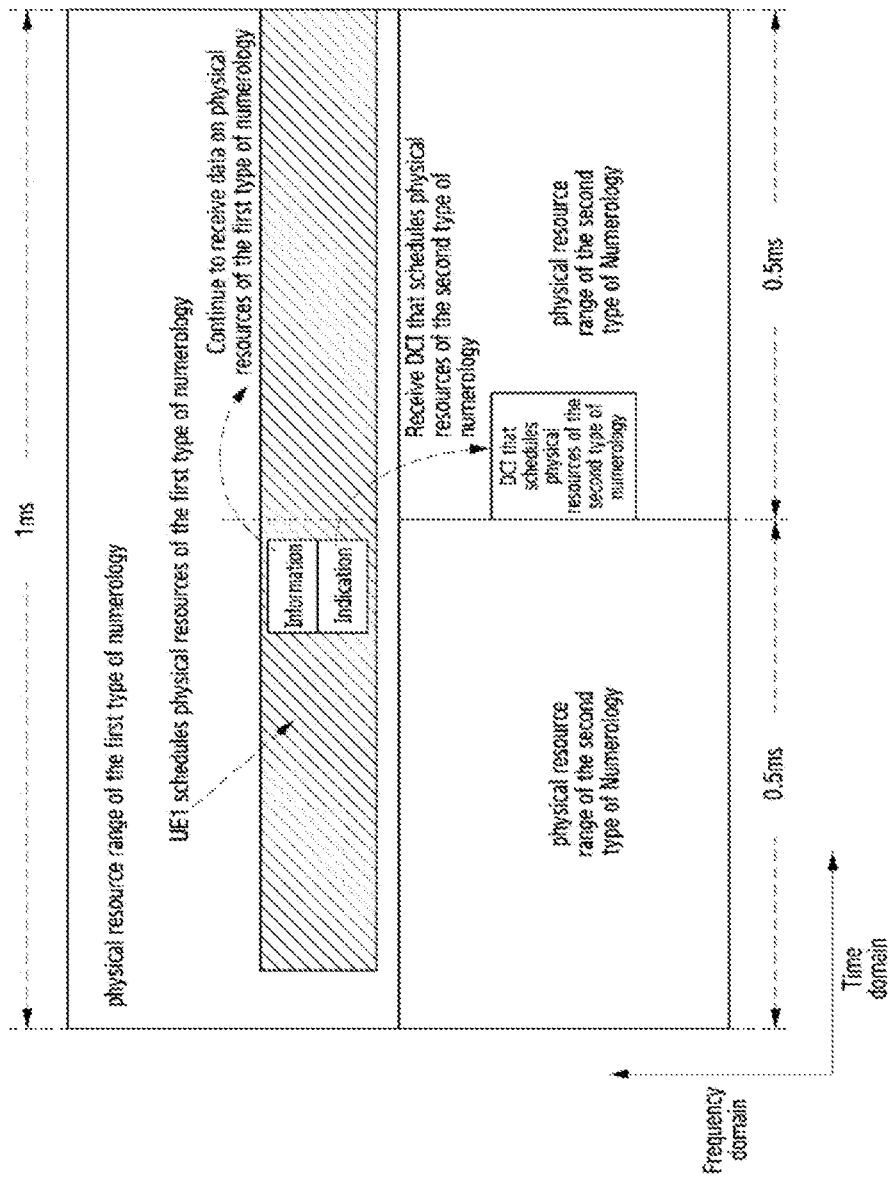
FIG. 12 is a schematic diagram showing that according to an indication by information transmitted on physical resources of a first type of numerology scheduled for the UE, the UE determines to receive DCI that schedules physical resources of a second type of numerology in a time slot, or determines to continue to receive data from the physical resources of the first type of numerology according to Way 3 of Method 3 in Embodiment 2 of the present disclosure.
Figure 13:
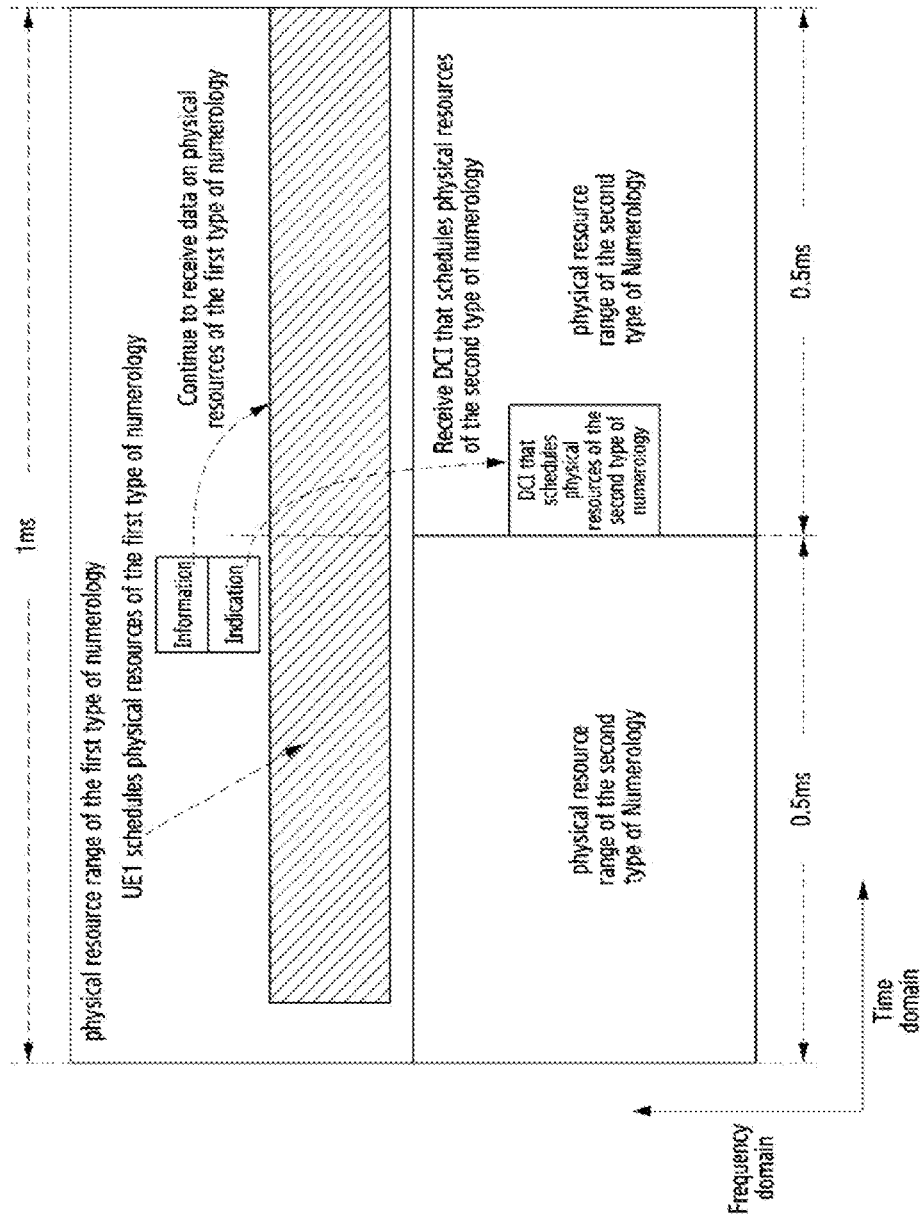
FIG. 13 is a schematic diagram showing that according to an indication by information transmitted on physical resources of a first type of numerology not scheduled for the UE, the UE determines to receive DCI that schedules physical resources of a second type of numerology in a time slot, or determines to continue to receive data from the physical resources of the first type of numerology according to Way 3 of Method 3 in Embodiment 2 of the present disclosure.

For example, the UE is configured to need to receive data transmitted on physical resources of two types of numerology in which a data block scheduled on a physical resource of one type of numerology occupies a time slot of 1 ms, and the physical resource of the one type of numerology is referred to as a physical resource of a first type of numerology, and a data block scheduled on a physical resource of the other type of numerology occupies a time slot of 0.5 ms, and the physical resource of the other type of numerology is referred to as a physical resource of a second type of numerology. In a time slot which is an even multiple of 0.5 ms, the UE may receive DCI that schedules the physical resources of the first type of numerology and DCI that schedules the physical resources of the second type of numerology, and in a time slot which is an odd multiple of 0.5 ms, the UE only receives DCI that schedules the physical resources of the second type of numerology. In a time slot which is an odd multiple of 0.5 ms, if the UE has not be scheduled to receive data of a time slot of 1 ms on a physical resource of the first type of numerology, the UE may receive DCI that schedules the physical resources of the second type of numerology from physical resources of a preset type of numerology, for example, receiving DCI that schedules physical resources of the second type of numerology from the physical resources of the preset type of numerology; in a time slot which is an odd multiple of 0.5 ms, if the UE has been scheduled to receive data of a time slot of 1 ms on a physical resource of the first type of numerology, the UE may determine to receive DCI that schedules the physical resources of the second type of numerology in the time slot, or continue to receive data on the physical resource of the first type of numerology, as shown in FIG. 12. Or the UE may determine to receive DCI that schedules the physical resources of the second type of numerology in the time slot, or continue to receive data on the physical resources of the first type of numerology according to an indication by information transmitted on the physical resource of the first type of numerology, as shown in FIG. 13.

Way 4:

If the UE needs to receive DCI that allocates physical resources of multiple types of numerology, the UE determines the types of numerology to receive DCI that allocates physical resources of numerology according to time positions. When the time slot lengths of physical resources of different numerology are different, pieces of DCI that allocate physical resources of different numerology are transmitted at different times in the time domain, and types of numerology to transmit the pieces of DCI are determined according to the types of numerology of physical resources allocated at different times. A mapping relationship between times of blindly detecting DCI and numerology of blindly detecting DCI transmitted may be configured by higher layer signaling or preset according to the protocol. For example, the UE needs to receive DCI that allocates physical resources of N types of numerology, and a mapping relationship between times of blindly detecting pieces of DCI that allocate physical resources of the N types of numerology and numerology of blindly detecting the pieces of DCI transmitted has been determined. If at a time of blindly detecting DCI that allocates a physical resource of the second type of numerology, the UE has not been configured to receive data on the physical resource allocated, the UE performs blind detection on a corresponding time-frequency position at the time according to the mapping relationship between times of blindly detecting pieces of DCI that allocate physical resources of the N types of numerology and numerology of blindly detecting the pieces of DCI transmitted; if at a time of blindly detecting DCI that allocates a physical resource of the second type of numerology, the UE has been allocated physical resources of the first type of numerology to receive data, the UE blindly detects DCI that schedules the physical resources of the second type of numerology on the physical resources of the first type of numerology allocated to receive data, and if the UE detects DCI that schedules a physical resource of the second type of numerology, then the UE receives data on the physical resource of the second type of numerology, and if the UE does not detect DCI that schedules a physical resource of the second type of numerology, then the UE continues to receive data on the physical resources of the first type of numerology. The DCI that schedules the physical resources of the second type of numerology transmitted on the physical resources of the first type of numerology is in a time slot before a time slot of the physical resource of transmitting the data of the second type of numerology, or the DCI that schedules the physical resources of the second type of numerology transmitted on the physical resources of the first type of numerology is in a time slot same with a time slot of the physical resource of transmitting the data of the second type of numerology.

Figure 14:
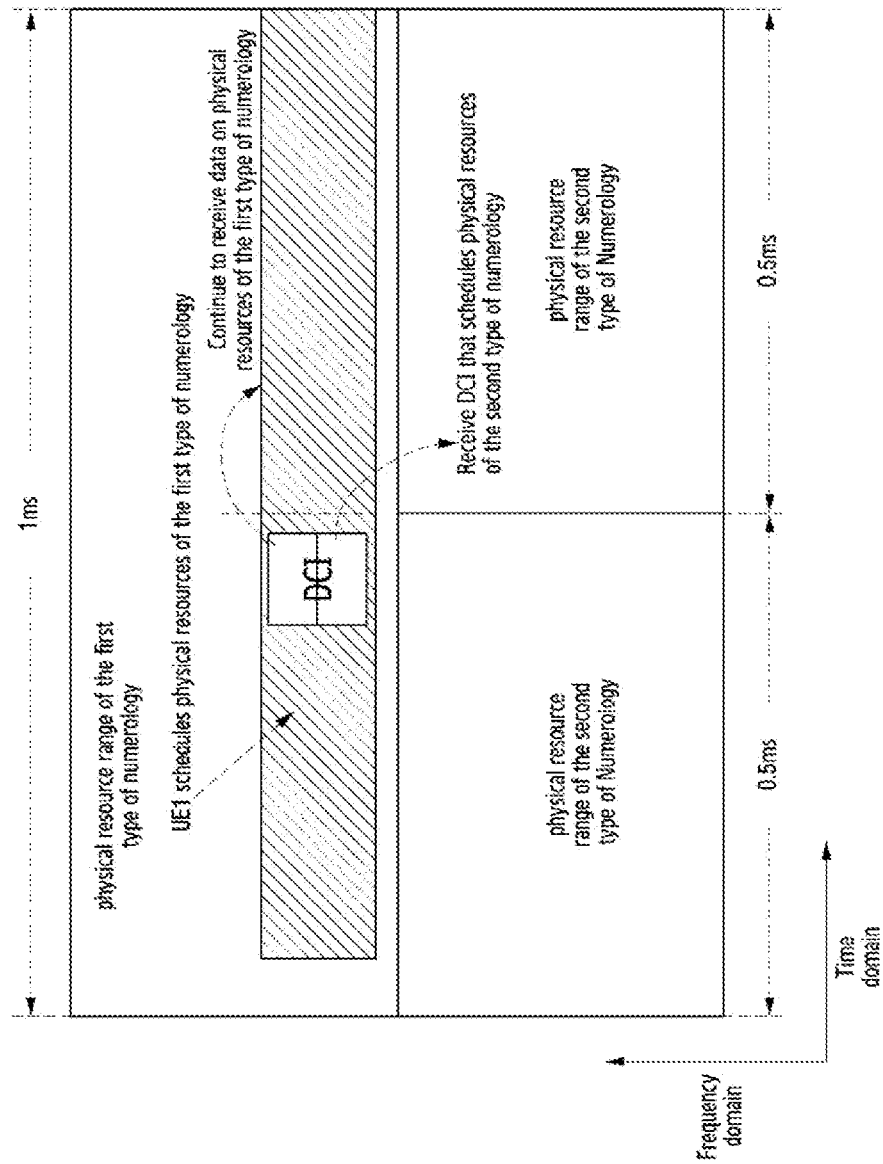
FIG. 14 is a schematic diagram of a first case according to Way 4 of Method 3 in Embodiment 2 of the present disclosure.
Figure 15:
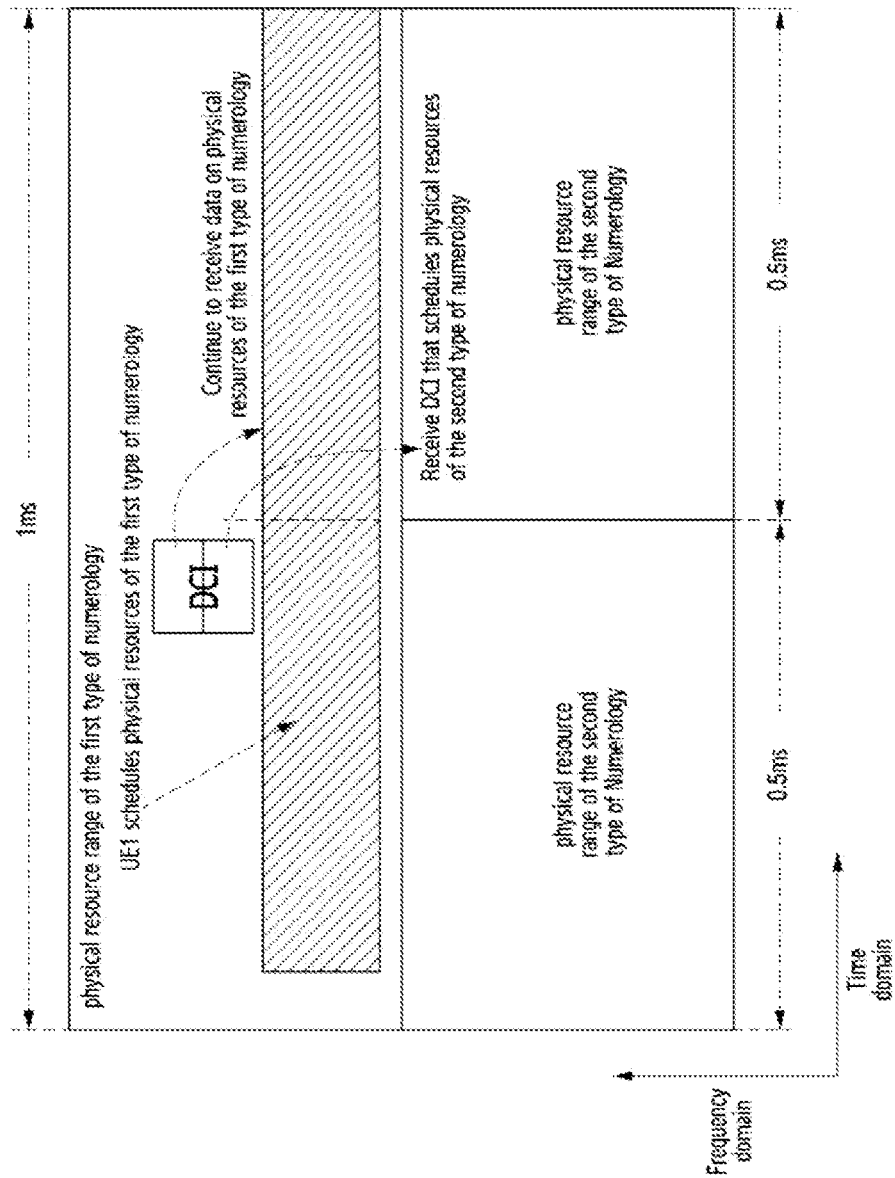
FIG. 15 is a schematic diagram of another case according to Way 4 of Method 3 in Embodiment 2 of the present disclosure.

For example, the UE is configured to need to receive data transmitted on physical resources of two types of numerology in which a data block scheduled on a physical resource of one type of numerology occupies a time slot of 1 ms, and the physical resource of the one type of numerology is referred to as a physical resource of a first type of numerology, and a data block scheduled on a physical resource of the other type of numerology occupies a time slot of 0.5 ms, and the physical resource of the other type of numerology is referred to as a physical resource of a second type of numerology. In a timeslot which is an even multiple of 0.5 ms, the UE may receive DCI that schedules the physical resources of the first type of numerology and DCI that schedules the physical resources of the second type of numerology, and in a time slot which is an odd multiple of 0.5 ms, the UE only receives DCI that schedules the physical resources of the second type of numerology. In a time slot which is an odd multiple of 0.5 ms, if the UE has not be scheduled to receive data of a time slot of 1 ms on a physical resource of the first type of numerology, the UE may receive DCI that schedules the physical resources of the second type of numerology from physical resources of a preset type of numerology, for example, receiving DCI that schedules physical resources of the second type of numerology from the physical resources of the preset type of numerology; in a time slot which is an odd multiple of 0.5 ms, if the UE has been scheduled to receive data of a time slot of 1 ms on a physical resource of the first type of numerology, the UE may blindly detect DCI that schedules physical resources of receiving the second type of numerology on the physical resource of the first type of numerology scheduled to the UE, and if the UE detects DCI that schedules the physical resources of the second type of numerology, then the UE receives data from the physical resources of the second type of numerology, and if the UE does not detect DCI that schedules the physical resources of the second type of numerology, then the UE continues to receive data from the physical resources of the first type of numerology, as shown in FIG. 14. Or the UE may blindly detect DCI that schedules physical resources of receiving the second type of numerology on the physical resources of the first type of numerology that have not been scheduled to the UE, and if the UE detects DCI that schedules the physical resources of the second type of numerology, then the UE receives data from the physical resources of the second type of numerology, and if the UE has not detected DCI that schedules the physical resources of the second type of numerology, then the UE continues to receive data on the physical resources of the first type of numerology, as shown in FIG. 15.

Way 5:

A type of numerology of DCI used to allocate physical resources of each type of numerology and a type of numerology of the DCI to schedule resources of transmitting data are the same, and after the UE receives DCI that schedules data, the UE receives data according to a subcarrier bandwidth and a CP length of an OFDM symbol of a type of numerology same with that used to receive DCI. Time-frequency positions of transmitting DCI physical resources of each type of numerology are configured by higher layer signaling or determined according to the protocol. Time-frequency positions of pieces of DCI used to allocate the physical resources of each type of numerology are as shown in FIG. 11, in which a piece of DCI that schedules a physical resource of the first type of numerology is transmitted using the first type of numerology, and a piece of DCI that schedules a physical resource of the second type of numerology is transmitted using the second type of numerology.

If the UE is configured to need to receive DCI that allocates physical resources of multiple types of numerology, the UE may first receive numerology indication information, and then know numerology of receiving DCI and receiving data through numerology indication information. For example, higher layer signaling may configure that the number of numerology possibly used to the UE to receive control signals and data is 2, and numerology indication information is 1 bit, used to indicate numerology for the UE to receive DCI and data. A mapping relationship between values of numerology indication information that indicates numerology for the UE to receive DCI and data and numerology is shown in Table 2.

Methods for transmitting numerology indication information are described in the following.

Figure 16:
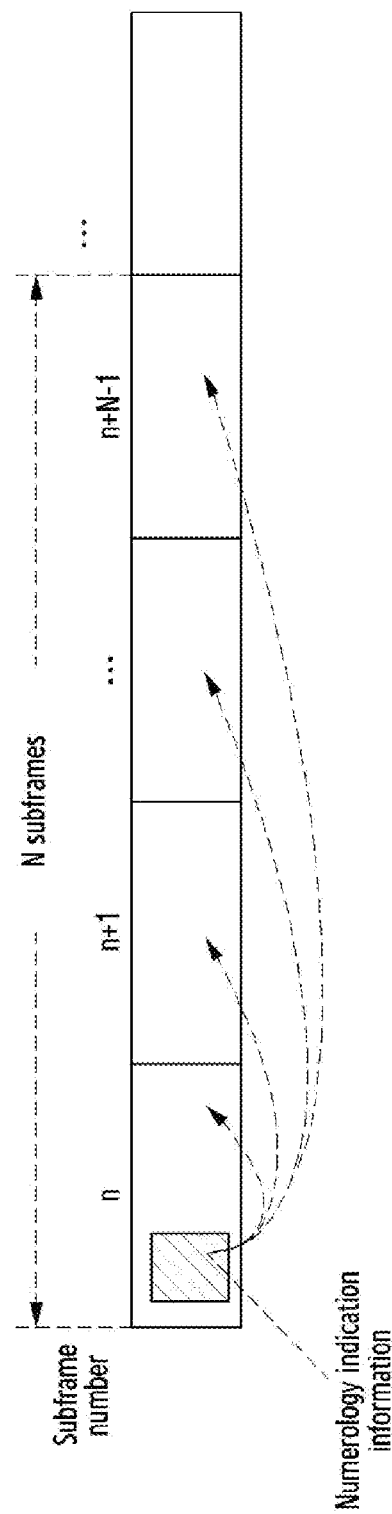
FIG. 16 is a schematic diagram of a first method for transmitting numerology indication information according to the present disclosure.

First method for transmitting numerology indication information:

Numerology indication information indicates numerology for the UE to receive control signals and data in a subframe where numerology indication information is transmitted, and numerology indication information indicates numerology for the UE to receive control signals and data in a current subframe. Or numerology indication information indicates a type of numerology for the UE to receive control signals and data in N (N is a positive integer, configured by higher layer or preset according to the protocol) subframes counted starting from a subframe n where numerology indication information is transmitted, as shown in FIG. 16.

In this case, numerology indication information is only transmitted on physical resources of one type of numerology, the UE knows a subframe position where the UE receives the numerology indication information by receiving higher layer signaling, and the UE knows a type of numerology of receiving the transmitted numerology indication information by receiving higher layer signaling. If the UE has not received numerology indication information properly in a subframe to receive numerology indication information, the UE may receive control signals and data according to a preset numerology or the UE may stop receiving control signals and data before it receives next numerology indication information.

Figure 17:
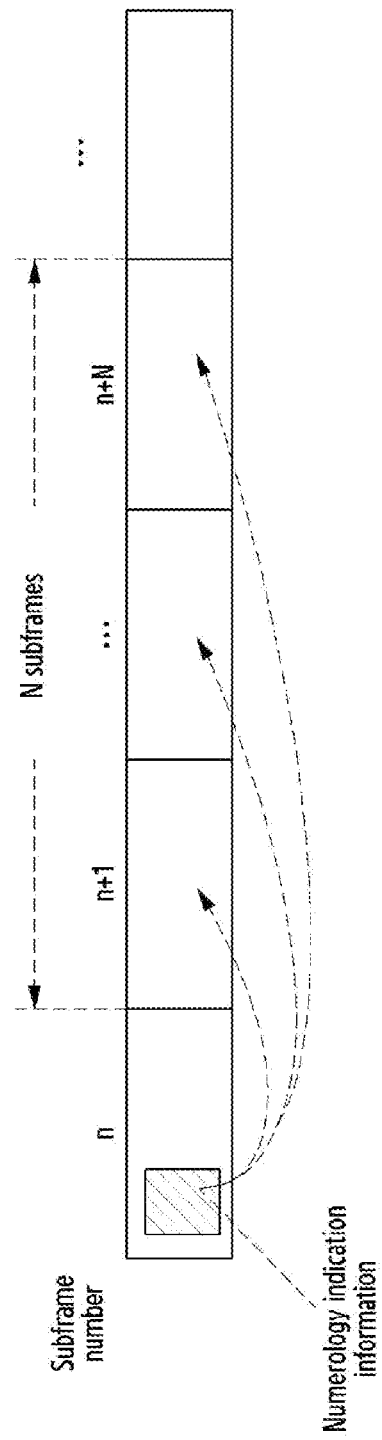
FIG. 17 is a schematic diagram of a second method for transmitting numerology indication information according to the present disclosure.

The second method for transmitting numerology indication information:

Numerology indication information indicates a type of numerology for the UE to receive control signals and data in a subframe n+k (k is a positive integer, configured by higher layer signaling or preset according to the protocol, e.g., k is equal to 1) after a subframe n where numerology indication information is transmitted. Or numerology indication information indicates a type of numerology for the UE to receive control signals and data in N (where N is a positive integer, and is configured by higher layer or preset by the protocol) subframes counted starting from the subframe n+k after the subframe n (k is a positive integer, configured by higher layer signaling or preset by the protocol) where numerology indication information is transmitted, as shown in FIG. 17.

In this case, numerology indication information is only transmitted on physical resources of one type of numerology, the UE knows a subframe position where the UE receives the numerology indication information by receiving higher layer signaling, and the UE knows a type of numerology of receiving the transmitted numerology indication information by receiving the higher layer signaling. If the UE receives control signals and data transmitted by different numerology in a subframe where the numerology indication information is received, the UE may first complete receipt of control signals and data transmitted by a first type of numerology, and then receives the numerology indication information. If the UE has not received numerology indication information properly on a subframe where numerology indication information is received, the UE may receive control signals and data according to a preset numerology or the UE may stop receiving control signals and data before it receives next numerology indication information.

Method 3 for Transmitting Numerology Indication Information:

Numerology indication information indicates a type of numerology for the UE to receive control signals and data in a subframe n+k (k is a positive integer, configured by higher layer signaling or preset according to the protocol, e.g., k is equal to 1) after a subframe n where numerology indication information is transmitted. Or numerology indication information indicates a type of numerology for the UE to receive control signals and data in N (where N is a positive integer, and is configured by higher layer or preset by the protocol) subframes counted starting from the subframe n+k after the subframe n (k is a positive integer, configured by higher layer signaling or preset by the protocol) where numerology indication information is transmitted, as shown in FIG. 17.

Figure 18:
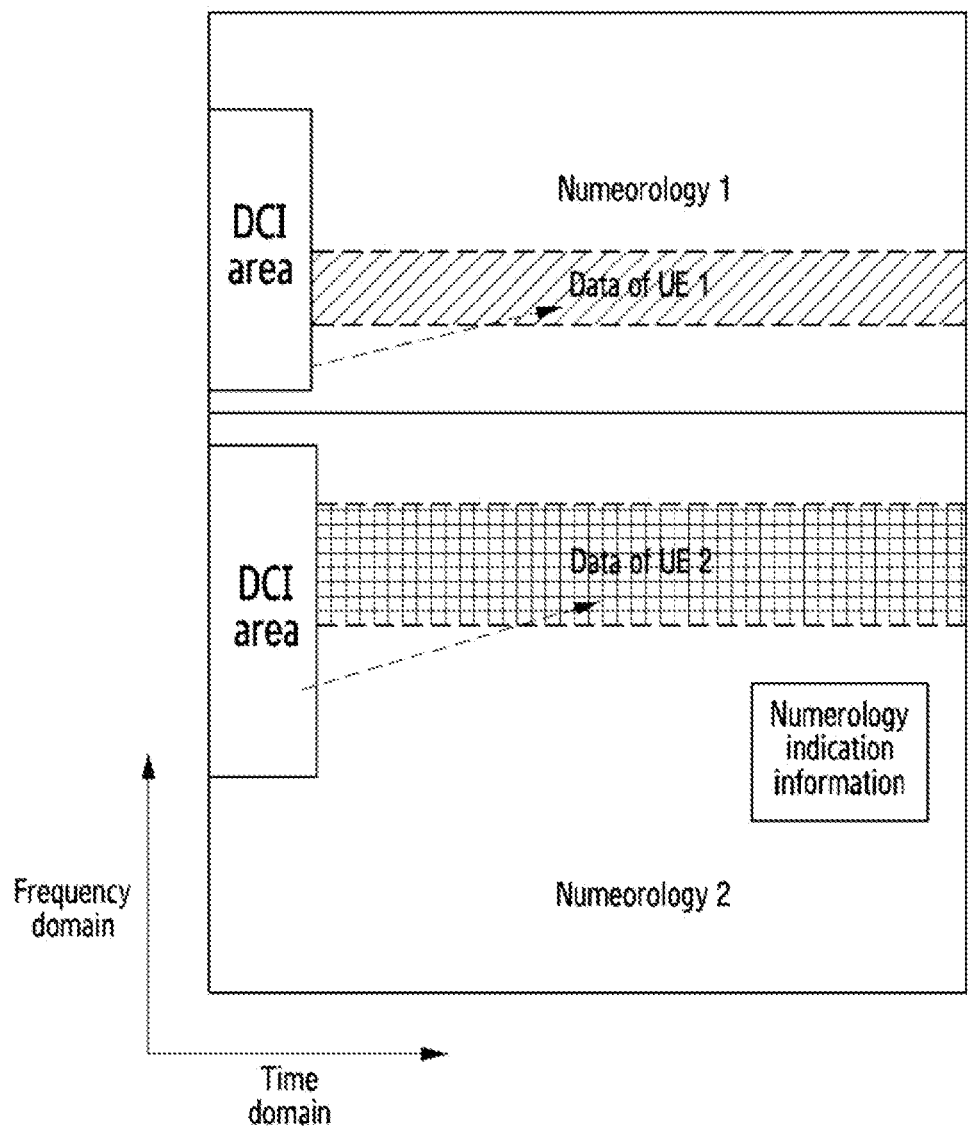
FIG. 18 is a schematic diagram of a third method for transmitting numerology indication information according to the present disclosure.

In this case, numerology indication information is only transmitted on physical resources of one type of numerology, the UE knows a subframe position to receive numerology indication information by receiving higher layer signaling, and the UE knows a type of numerology of receiving the transmitted numerology indication information by receiving the higher layer signaling. If the UE needs to receive control signals and data transmitted according to the same numerology at the same time within a subframe to receive numerology indication information, the UE receives both control signals and data and the numerology indication information; if the UE does not need to receive control signals and data transmitted within the subframe to receive numerology indication information, the UE receives numerology indication information; and if the UE needs to receive control signals and data transmitted according to different numerology within the subframe to receive numerology indication information, the UE receives control signals and data, and receives numerology indication information contained in control signals that schedules the transmission within the UE, or receives numerology indication information transmitted in resources of control signals that schedules the transmission of the UE and data. As shown in FIG. 18, a UE1 needs to receive control signals and data transmitted according to different numerology within a subframe to receive numerology indication information, the UE1 may receive control signals and data, and receive numerology indication information contained in control signals schedules the transmission of the UE1, or receive numerology indication information transmitted in resources of control signals that schedules the transmission of the UE and data. In the subframe to receive numerology indication information, a UE2 needs to receive control signals and data transmitted according to the same numerology, and the UE2 can receive control signals and data and numerology indication information at the same time. For a UE3 which has not detected control signals or data in the subframe, the UE3 may receive only numerology indication information.

If the UE has not received numerology indication information properly in the subframe to receive numerology indication information, the UE may receive control signals and data according to a preset numerology or the UE may stop receiving control signals and data before it receives next numerology indication information.

Embodiment 3

The present embodiment describes several methods in a case where if a carrier (or referred to as a serving cell) includes physical resources of multiple types of numerology, how a range of resources occupied by each type of numerology changes.

Method 1

Figure 19:
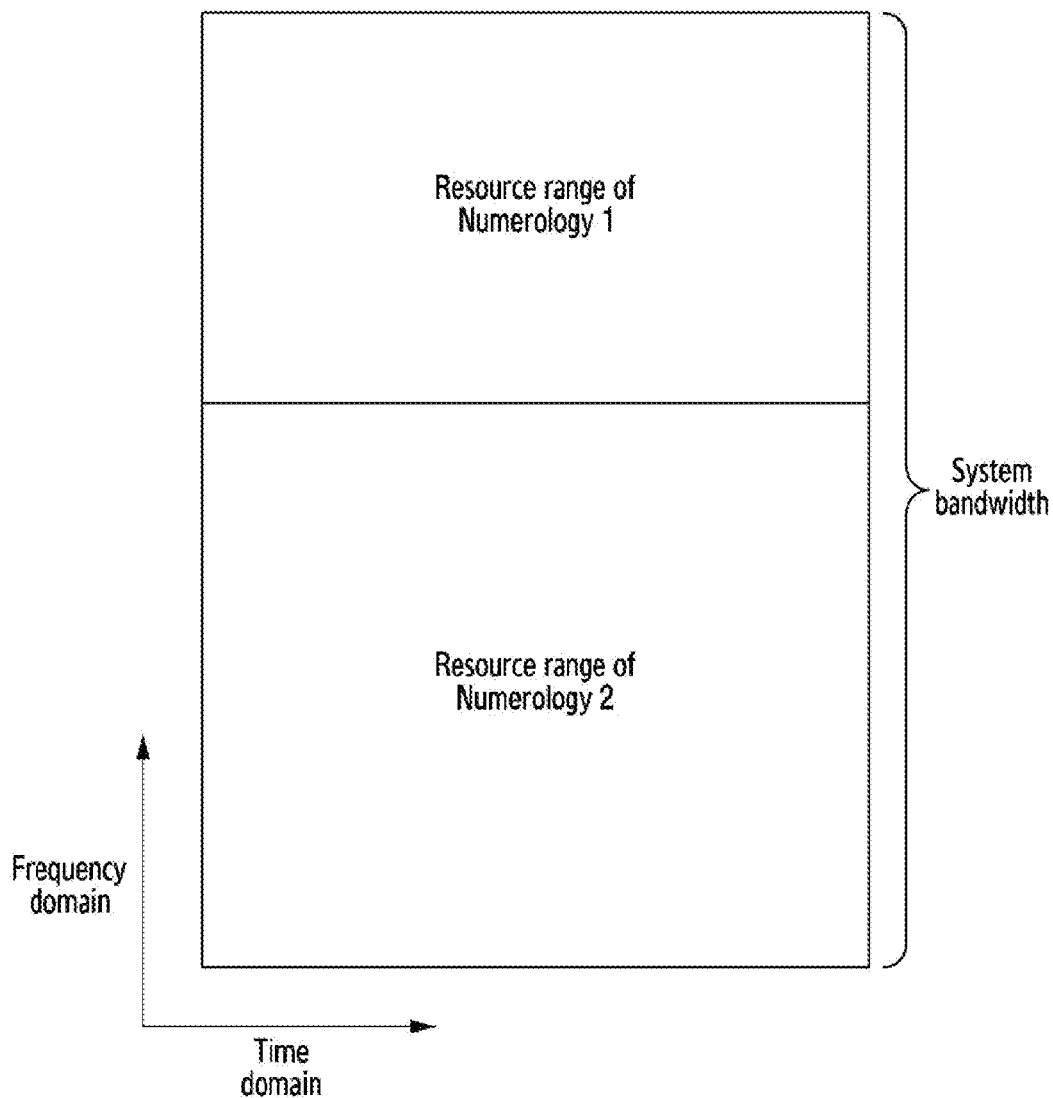
FIG. 19 is a schematic diagram of a first method for determining a range of each type of numerology according to Embodiment 3 of the present disclosure.

If in the system bandwidth of a carrier (or referred as a serving cell), there are resources of multiple types of numerology, the number of the types of numerology within the system bandwidth and the range of resources of each type of numerology are configured by higher layer signaling or indicated by system information, as shown in FIG. 19.

Method 2

If in the system bandwidth of a carrier (or referred to as a serving cell), there are resources of multiple types of numerology, the number of the types of numerology within the system bandwidth is configured by higher layer signaling or indicated by system information. The range of time-frequency resources of each type of numerology dynamically changes, and changes in the following two ways.

Figure 20:
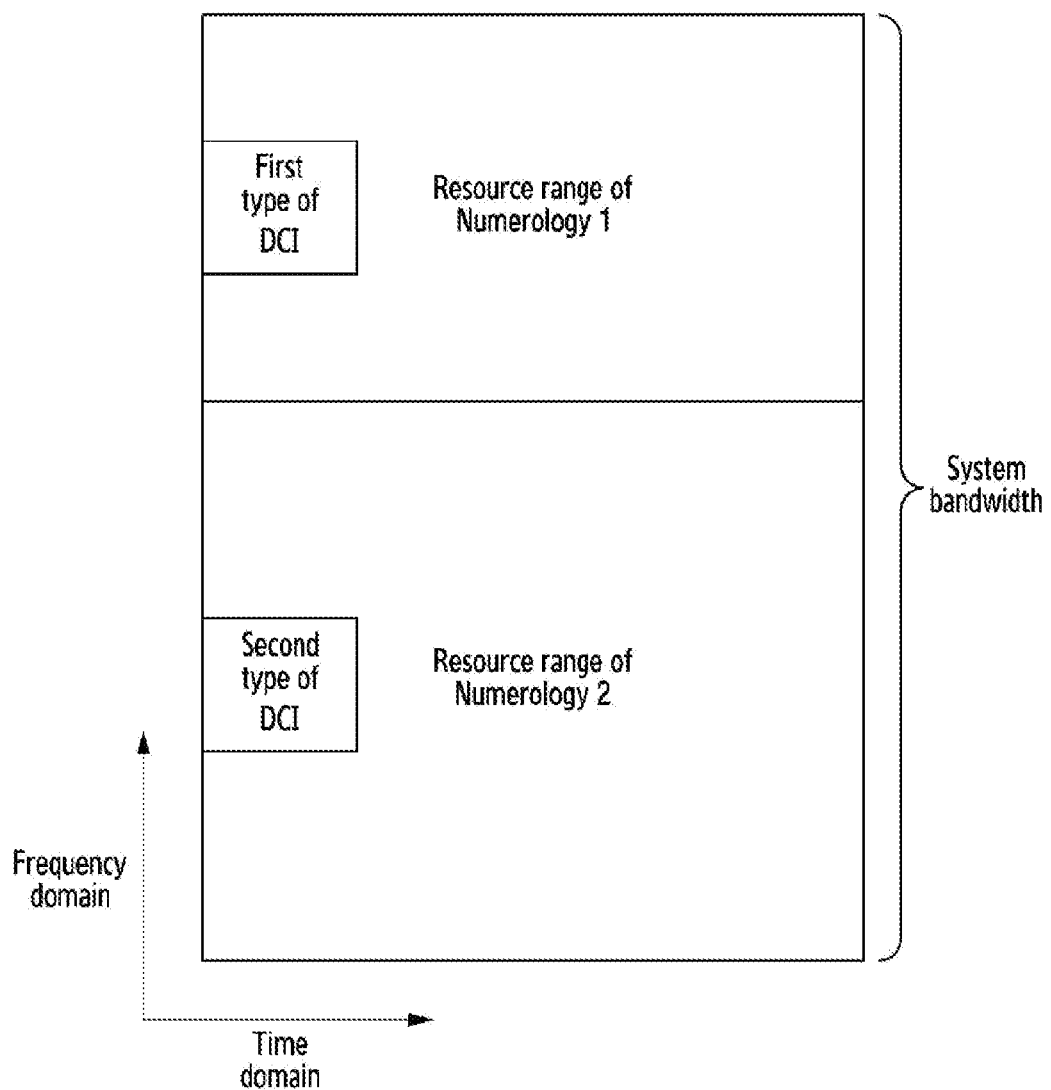
FIG. 20 is a schematic diagram of a second method for determining a range of each type of numerology according to Embodiment 3 of the present disclosure.

One way is implicitly changing, i.e., being implicitly indicated by DCI that schedules resources. For example, in a system bandwidth, there are resources of two types of numerology in which the resources of the first type of numerology are scheduled by the first type of DCI, and time-frequency positions of the first type of DCI is configured by higher layer signaling or preset, the resources of the second type of numerology are scheduled by the second type of DCI, and time-frequency positions of the second type of DCI are configured by higher layer signaling or preset, and in this way, the UE knows a type of numerology of resources scheduled by detecting different types of DCI, as shown in FIG. 20.

Figure 21:
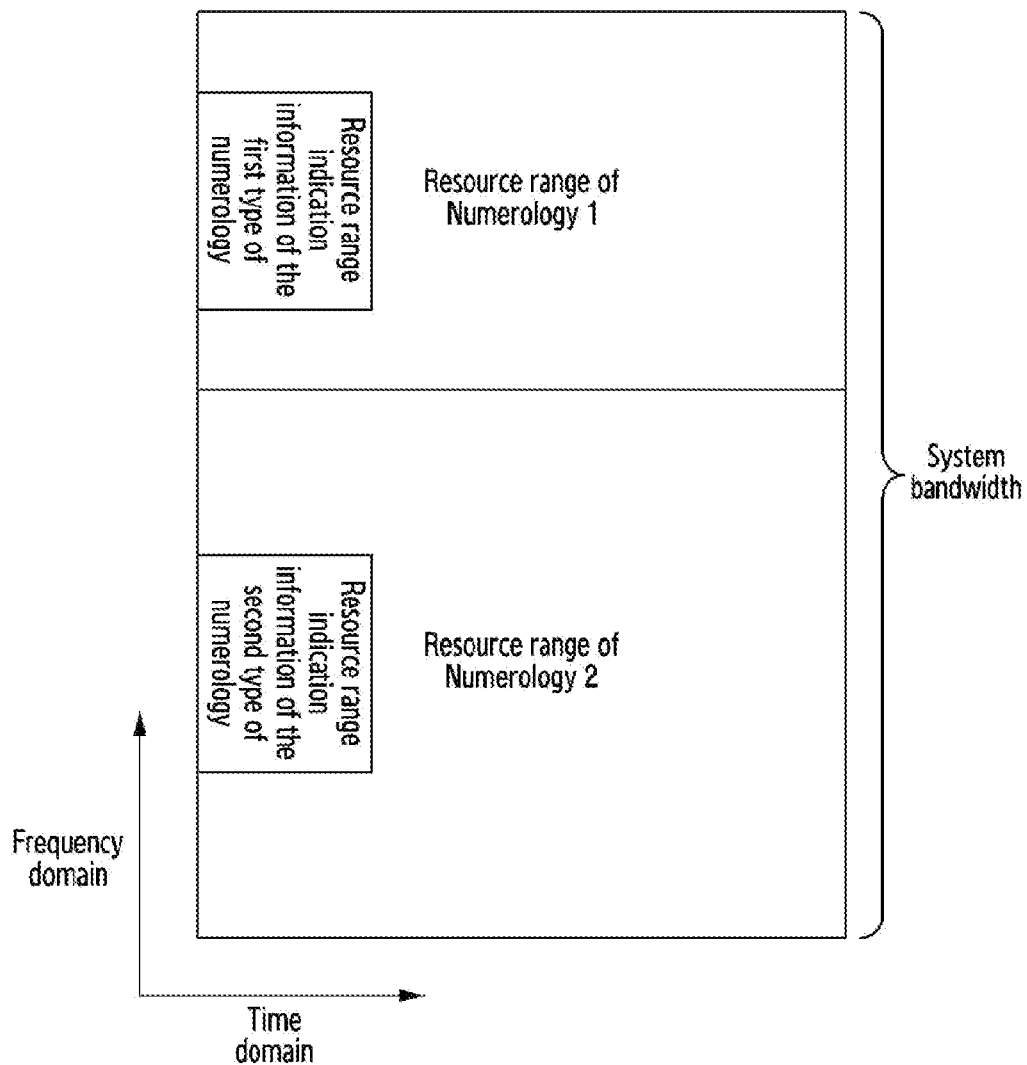
FIG. 21 is a schematic diagram of a third method for determining a range of each type of numerology according to Embodiment 3 of the present disclosure.

Another method is explicit indication, i.e., using numerology resource range indication information to explicitly indicate a range of each type of numerology, and in the system width, there is numerology resource range indication information for each type of numerology resource, and a time-frequency position to transmit the numerology resource range indication information is configured by higher layer or preset, as shown in FIG. 21, or the numerology resource range indication information indicating a range of resources of all types of numerology is transmitted within the range of resources of a type of numerology.

Figure 22:
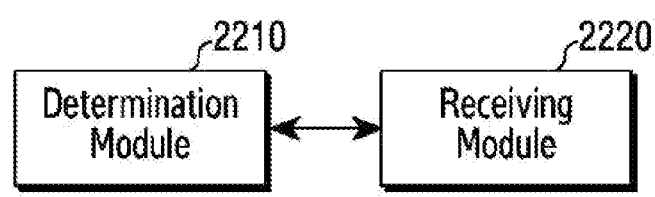
FIG. 22 is a schematic diagram of a structure of a preferable apparatus according to the present disclosure.

Corresponding to above method, the present disclosure further provides an apparatus a structure of which is shown in FIG. 22, comprising: a determining module 2210 and a receiving module 2220. The determination module 2210 determines a type of numerology of the physical resources to receive control signals and data from at least two types of multicarrier parameter numerology. The receiving module 2220 receives control signals and data on determined physical resource according to the determined type of numerology.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the foregoing may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   identifying a plurality of numerologies for one or more resources based on a higher layer signaling;
   receiving control information indicating a resource;
   identifying a numerology associated with the resource based on the plurality of numerologies for the one or more resources; and
   receiving data based on the identified numerology associated with the resource,
   wherein the numerology comprises a subcarrier spacing and a length of a cyclic prefix.

2. The method of claim 1, wherein the control information comprises a downlink control information (DCI).

3. The method of claim 1, wherein the control information is received based on the numerology associated with the resource.

4. A method performed by a base station (BS) in a wireless communication system, the method comprising:
   transmitting information on a plurality of numerologies for one or more resources via a higher layer signaling;
   transmitting control information indicating a resource; and
   transmitting data based on a numerology associated with the resource among the plurality of numerologies for the one or more resources,
   wherein the numerology comprises a subcarrier spacing and a length of a cyclic prefix.

5. The method of claim 4, wherein the control information comprises a downlink control information (DCI).

6. The method of claim 4, wherein the control information is transmitted based on the numerology associated with the resource.

7. A user equipment (UE) in a wireless communication system, the user equipment comprising:
   a transceiver; and
   at least one processor operably coupled to the transceiver, and configured to:
   identify a plurality of numerologies for one or more resources based on a higher layer signaling,
   receive control information indicating a resource,
   identify a numerology associated with the resource based on the plurality of numerologies for the one or more resources, and
   receive data based on the identified numerology associated with the resource,
   wherein the numerology comprises a subcarrier spacing and a length of a cyclic prefix.

8. The UE of claim 7, wherein the control information comprises a downlink control information (DCI).

9. The UE of claim 7, wherein the control information is received based on the numerology associated with the resource.

10. A base station (BS) in a wireless communication system, the BS comprising:
    a transceiver; and
    at least one processor operably coupled to the transceiver, and configured to:
    transmit information on a plurality of numerologies for one or more resources via a higher layer signaling, transmit control information indicating a resource, and
transmit data based on a numerology associated with the resource among the plurality of numerologies for the one or more resources,
wherein the numerology comprises a subcarrier spacing and a length of a cyclic prefix.

11. The BS of claim 10, wherein the control information comprises a downlink control information (DCI).

12. The BS of claim 10, wherein the control information is transmitted based on the numerology associated with the resource.

* * * * *